United States Patent [19]
Nanba et al.

[11] Patent Number: 6,117,542
[45] Date of Patent: Sep. 12, 2000

[54] FLAME RETARDANT RESIN COMPOSITION

[75] Inventors: Nobutsugu Nanba; Hideki Nasu, both of Kurashiki, Japan

[73] Assignee: Asahi Kasei Kogyo Kabushiki Kaisha, Osaka, Japan

[21] Appl. No.: 09/024,745

[22] Filed: Feb. 17, 1998

[30] Foreign Application Priority Data

Feb. 17, 1997 [JP] Japan ................................. 9-046893

[51] Int. Cl.[7] .................................................. B32B 5/16
[52] U.S. Cl. ........................ 428/327; 428/412; 428/421; 428/422; 428/920; 428/339; 524/520; 525/199; 525/928
[58] Field of Search .................................. 428/323, 327, 428/421, 422, 412, 920, 921; 524/520; 525/199, 928

[56] References Cited

U.S. PATENT DOCUMENTS

| | | | |
|---|---|---|---|
| 3,005,795 | 10/1961 | Busse et al. | 525/199 |
| 3,671,487 | 6/1972 | Abolins | 524/141 |
| 4,463,130 | 7/1984 | Serini et al. | 525/67 |
| 4,742,115 | 5/1988 | Mawatari et al. | 525/68 |
| 4,786,686 | 11/1988 | Laughner et al. | 525/67 |
| 4,788,277 | 11/1988 | Ibe et al. | 528/215 |
| 4,810,739 | 3/1989 | Lindner et al. | 524/371 |
| 4,983,658 | 1/1991 | Kress et al. | 524/141 |
| 5,041,479 | 8/1991 | Ogoe | 524/168 |
| 5,061,745 | 10/1991 | Wittmann et al. | 524/139 |
| 5,109,044 | 4/1992 | Ho et al. | 514/142 |
| 5,204,394 | 4/1993 | Gosens et al. | 524/125 |
| 5,225,471 | 7/1993 | Tajima et al. | 524/284 |
| 5,276,078 | 1/1994 | Ogoe et al. | 524/141 |
| 5,451,632 | 9/1995 | Okumura et al. | 524/537 |
| 5,753,358 | 5/1998 | Korleski | 428/308.4 |
| 5,837,757 | 11/1998 | Nodera et al. | 524/87 |
| 6,025,441 | 2/2000 | Koshirai et al. | 525/199 |

FOREIGN PATENT DOCUMENTS

| | | |
|---|---|---|
| 04 83510A2 | 5/1992 | European Pat. Off. |
| 0718346A1 | 6/1996 | European Pat. Off. |
| 59-64651A | 4/1984 | Japan |
| 60-13844A | 1/1985 | Japan |
| 63-286463A | 11/1988 | Japan |
| 232154A | 2/1990 | Japan |
| 3190958A | 8/1991 | Japan |
| 4272957A | 9/1992 | Japan |
| 4506829A | 11/1992 | Japan |
| 513966B2 | 2/1993 | Japan |
| 5504582A | 7/1993 | Japan |
| 81888653A | 7/1996 | Japan |

OTHER PUBLICATIONS

*Fusso Jushi Hando Bukku* (*Fluororesin Handbook*), pp. 26–33, published in 1990 by the Nikkan Kogyo Shimbun Ltd., Japan (not translated).

*Primary Examiner*—H. Thi Le
*Attorney, Agent, or Firm*—Birch, Stewart, Kolasch & Birch, LLP

[57] ABSTRACT

A flame retardant resin composition comprising a thermoplastic resin/flame retardant mixture having fluororesin fibrils dispersed therein, wherein, when a breakage-exposed surface of a tensile force-broken piece of a test sample prepared from the flame retardant composition by injection molding so as to be used in a flame retardancy test by the Vertical Burning Method described in UL-Subject 94 is examined by means of a SEM with respect to a predetermined area of 7 $\mu$m×7 $\mu$m wherein the fibrils are dispersed in the entire region of the predetermined area, the dispersed fibrils exhibit a dispersion morphology in which the fibrils have a diameter of 0.5 mm or less over lengths of the fibrils which lengths correspond to 50% or more of the total length of the fibrils and in which the fibrils have a network configuration comprising one or more intersecting points of fibrils and/or a branched configuration comprising one or more branching points of fibrils, wherein 5 or more intersecting points and/or branching points are present in the predetermined area. The resin composition of the present invention is advantageous not only in that it has high flame retardancy, especially a high property of dripping-prevention upon being burnt, but also in that a shaped article obtained from the resin composition has excellent appearance.

13 Claims, 8 Drawing Sheets

2μm

2μm

2μm

FLAME RETARDANT RESIN COMPOSITION

BACKGROUND OF THE INVENTION

1. Field of The Invention

The present invention relates to a flame retardant resin composition comprising a thermoplastic resin, a flame retardant and a fluororesin, and a method for producing the same. More particularly, the present invention is concerned with a flame retardant resin composition comprising a thermoplastic resin, a flame retardant and a fluororesin, wherein the fluororesin is present in the form of fibrils, and the thermoplastic resin and the flame retardant are present in the form of a mixture thereof, and wherein, when a breakage-exposed surface of a broken piece of a test sample prepared by injection molding from the resin composition (which breakage-exposed surface of the broken piece is obtained by applying to the test sample a tensile force sufficient to break the test sample) is examined by means of a scanning electron microscope with respect to a predetermined area of 7 $\mu$m×7 $\mu$m wherein the fibrils are dispersed in the entire region of the predetermined area, the dispersed fibrils exhibit a specific dispersion morphology. The flame retardant resin composition of the present invention is advantageous not only in that it has high flame retardancy, especially a high property of dripping-prevention upon being burnt, but also in that a shaped article obtained from the resin composition has excellent appearance, specifically an excellent luster and a decreased occurrence of flow mark.

2. Prior Art

There is an increasing demand for improved safety in the accident of fire. In accordance with this increasing demand, regulations concerning flame retardancy have become rigorous, so that techniques for imparting flame retardancy to resins have become important. Thus, flame retardancy is one of the most essential properties for resins for use in various application fields, especially office automation machines, such as computers, word-processors, printers and copying machines, and household electrical appliances, such as television sets and game machines.

For obtaining an evaluation of high-level flame retardancy in the Vertical Burning Test described in UL-Subject 94 prescribed by Underwriters Laboratories Inc., U.S.A., it is necessary that a resin do not cause a dripping of a flaming particle. Also from a practical viewpoint, for preventing a spread of fire, it is an important task to impart a dripping-preventive property to a resin.

For meeting the demand for resins having a dripping-preventive property, it has been attempted to add an anti-dripping agent to thermoplastic resins. For example, Unexamined Japanese Patent Application Laid-Open Specification No. 3-190958 discloses a thermoplastic resin composition which contains a silicone resin as an anti-dripping agent. Recently, however, it is a general tendency to use, as an anti-dripping agent, a fluororesin having a fibril-forming ability, and many attempts to use such a fluororesin have been made.

In this connection, however, it is noted that, although U.S. Pat. No. 3,005,795 discloses a resin composition comprising a thermoplastic resin and a fluororesin having a fibril-forming ability, the incorporation of a fluororesin having a fibril-forming ability in this U.S. Pat. No. 3,005,795 is not intended to improve the dripping-preventive property of a thermoplastic resin, but intended to increase the melt viscosity of a thermoplastic resin.

As mentioned above, various attempts have been made in which a fluororesin is used in order to improve flame retardancy, especially dripping-preventive property.

For example, Unexamined Japanese Patent Application Laid-Open Specification No. 59-64651 (corresponding to U.S. Pat. No. 4,463,130) discloses a composition obtained by adding a polytetrafluoroethylene (PTFE) to a resin composition comprising a polycarbonate resin, a styrene polymer and a flame retardant. Further, Unexamined Japanese Patent Application Laid-Open Specification No. 63-286463 (corresponding to U.S. Pat. No. 4,786,686) discloses a composition obtained by adding a fluororesin having a fibril-forming ability to a resin composition comprising a polycarbonate resin and a rubber polymer. In these two prior art documents, an improvement in dripping-preventive property is mentioned as an effect which can be obtained by the techniques of these prior art documents; however, in these prior art documents, there is no description as to whether or not there occurs the formation of fluororesin fibrils having a very small diameter, and whether or not there occurs the formation of fluororesin fibrils having a network configuration or a branched configuration, and there is no description as to how to obtain fluororesin fibrils having a very small diameter and having a network configuration or a branched configuration. Moreover, in these two prior art documents, there is no description about a technique in which an improved dripping-preventive property can be efficiently achieved with reproducibility, using a small amount of a fluororesin.

Japanese Patent Application prior-to-examination Publication (kohyo) Nos. 5-504582 (corresponding to U.S. Pat. No. 5,109,044) and 4-506829 (corresponding to U.S. Pat. No. 5,276,078) disclose a composition obtained by adding PTFE (having a fibril-forming ability and having the capability of exhibiting a thermal shrinking ratio of 15% or more) to a resin composition comprising a polycarbonate resin and an ABS resin. In these prior art documents, an improvement in dripping-preventive property is mentioned as an effect which can be obtained by the technique of these prior art documents, and it is described that this effect can be obtained by virtue of the fibrous structure of PTFE and a thermal shrinkage of the fibrous structure. However, in these two prior art documents, there is no description as to whether or not there occurs the formation of fluororesin fibrils having a very small diameter, and whether or not there occurs the formation of fluororesin fibrils having a network configuration or a branched configuration, and there is no description as to how to obtain fluororesin fibrils having a very small diameter and having a network configuration or a branched configuration. Moreover, in these two prior art documents, there is no description about a technique in which an improved dripping-preventive property can be efficiently achieved with reproducibility, using a small amount of a fluororesin.

There have been known several methods for incorporating a fluororesin into a resin composition.

For example, Unexamined Japanese Patent Application Laid-Open Specification Nos. 60-13844 (corresponding to U.S. Pat. No. 4,810,739) and 2-32154 (corresponding to U.S. Pat. No. 5,061,745) disclose a method for incorporating PTFE into a resin composition comprising a polycarbonate, an ABS resin and a flame retardant, wherein an aqueous dispersion of PTFE (having a solids content of about 60% by weight) and an aqueous emulsion of an ABS resin are mixed with each other, and the resultant mixture is subjected to coagulation to obtain a coagulated PTFE/ABS composition, and the obtained coagulated composition is melt-kneaded together with a polycarbonate and a flame retardant. This prior art document describes that this method improves the flame retardancy and dripping-preventive property of a thermoplastic resin composition and solves the surface defect problem of a shaped article.

Unexamined Japanese Patent Application Laid-Open Specification No. 4-272957 (corresponding to EP No. 483510) discloses a method for incorporating an elastomeric, impact resistance-improving agent into a polycarbonate, wherein elastomer particles are coated with a PTFE having a fibril-forming ability, and the resultant PTFE-coated elastomer particles are added to a polycarbonate. This prior art document describes that, by this method, the dispersibility of elastomer particles is improved to thereby prevent a coagulation of elastomer particles, so that a resin composition having improved flame retardancy and having a capability of providing a shaped article having improved appearance can be obtained.

Unexamined Japanese Patent Application Laid-Open Specification No. 8-188653 (corresponding to EP No. 718346) discloses a method for dispersing a solid additive, such as PTFE, into a thermoplastic resin, wherein a mixture of a thermoplastic resin solution and a PTFE dispersion is subjected to, e.g., spray drying to thereby remove the solvent and dispersion medium from the mixture, and the resultant spray dried composition is melt-kneaded. This prior art document describes that, by this method, the dispersibility of a solid additive, such as PTFE, can be improved, so that a shaped article having improved appearance while maintaining a satisfactory mechanical strength can be produced.

By these methods for incorporating a fluororesin into a resin composition, the dispersibility of PTFE in a fibrous form can be improved, so that the appearance of a shaped article can be improved. However, these methods can only achieve an improved dispersibility of a fibrous PTFE. By these methods, the dripping-preventive performance of PTFE cannot be improved, so that a satisfactory dripping-preventive performance of PTFE cannot be achieved. In addition, the improvement in the appearance of a shaped article is unsatisfactory.

In recent years, in the field of office automation machines, the coloring of a shaped article by performing a coating on the shaped article is not frequent, but the coloring of a shaped article is conducted mainly by incorporating a colorant into a molding material to be used for producing the shaped article. Therefore, it is desired to produce a shaped article having a good appearance and a decreased occurrence of flow mark.

A task of the present invention is to provide a flame retardant resin composition comprising a thermoplastic resin, a flame retardant, and a fluororesin as an anti-dripping agent, wherein the fluororesin is present in the form of fibrils having a specific dispersion morphology which enables the resin composition to have advantages not only in that it has high flame retardancy, especially a high property of dripping-prevention upon being burnt, but also in that a shaped article obtained from the resin composition has excellent appearance. Another task of the present invention is to provide a method for producing such a resin composition.

SUMMARY OF THE INVENTION

In this situation, the present inventors have made extensive and intensive studies with a view toward solving the above-mentioned problems accompanying the prior art. As a result, they have unexpectedly found that a flame retardant resin composition comprising specific amounts of a thermoplastic resin, a fluororesin and a flame retardant, wherein the fluororesin is present in the form of fibrils which exhibit a specific dispersion morphology as mentioned below when a breakage-exposed surface of a broken piece obtained by applying a tensile force to a test sample of the resin composition is examined by means of a scanning electron microscope with respect to a predetermined area of $7 \mu m \times 7 \mu m$, is advantageous not only in that it has high flame retardancy, especially high property of dripping-prevention upon being burnt, but also in that a shaped article obtained from the resin composition has excellent appearance, such as luster. The above-mentioned specific dispersion morphology is such that the fibrils have a diameter of $0.5 \mu m$ or less over lengths of the fibrils which lengths correspond to 50% or more of the total length of the fibrils, and that the fibrils have at least one configuration selected from the group consisting of a network configuration comprising one or more intersecting points at which at least two fibrils intersect with each other and a branched configuration comprising one or more branching points at which a fibril branches into at least two fibrils, wherein 5 or more points selected from the group consisting of the intersecting points and the branching points are present in the predetermined area of $7 \mu m \times 7 \mu m$. Further, the present inventors have found an effective and efficient method for realizing the above-mentioned specific dispersion morphology of dispersed fluororesin fibrils in a resin composition comprising a thermoplastic resin, a fluororesin and a flame retardant. The method consists in melt-kneading a part or all of a desired amount of a thermoplastic resin and, if desired, a part of all of a desired amount of a flame retardant, thereby forming a melt-kneaded material; and adding a fluororesin to the melt-kneaded material, followed by melt-kneading together the fluororesin and the melt-kneaded material, thereby forming a fluororesin-containing thermoplastic resin composition, wherein the fluororesin is in the form of an aqueous dispersion thereof (having a fluororesin particle diameter of from 0.05 to 0.5 $\mu m$ and having a solids content of from 10 to 70% by weight), and wherein, when any of the amounts of the thermoplastic resin and the flame retardant which are used in the step for obtaining the melt-kneaded material, is smaller than the respective desired amount, the material(s) other than the above-mentioned dispersion of fluororesin (i.e., the thermoplastic resin and/or the flame retardant) is (are) added, in an amount necessary for meeting the desired amount(s) of the material(s) other than the fluororesin, to the fluororesin-containing thermoplastic resin composition in at least one additional subsequent stage, wherein the resultant mixture in each stage is subjected to further melt-kneading. The present invention has been completed, based on the above novel findings.

Accordingly, it is an object of the present invention to provide a highly flame retardant resin composition wherein fluororesin fibrils dispersed in the composition exhibit a specific dispersion morphology which enables the resin composition to have advantages not only in that it has high flame retardancy, especially a high property of dripping-prevention upon being burnt, but also in that a shaped article obtained from the resin composition has excellent appearance.

It is another object of the present invention to provide a method for effectively and efficiently producing the above-mentioned flame retardant resin composition wherein fluororesin fibrils dispersed in the composition exhibit a specific dispersion morphology which enables the resin composition to have advantages not only in that it has high flame retardancy, especially a high property of dripping-prevention upon being burnt, but also in that a shaped article obtained from the resin composition has excellent appearance.

The foregoing and other objects, features and advantages of the present invention will be apparent from the following detailed description taken in connection with the accompanying drawing and the appended claims.

Figure 1:
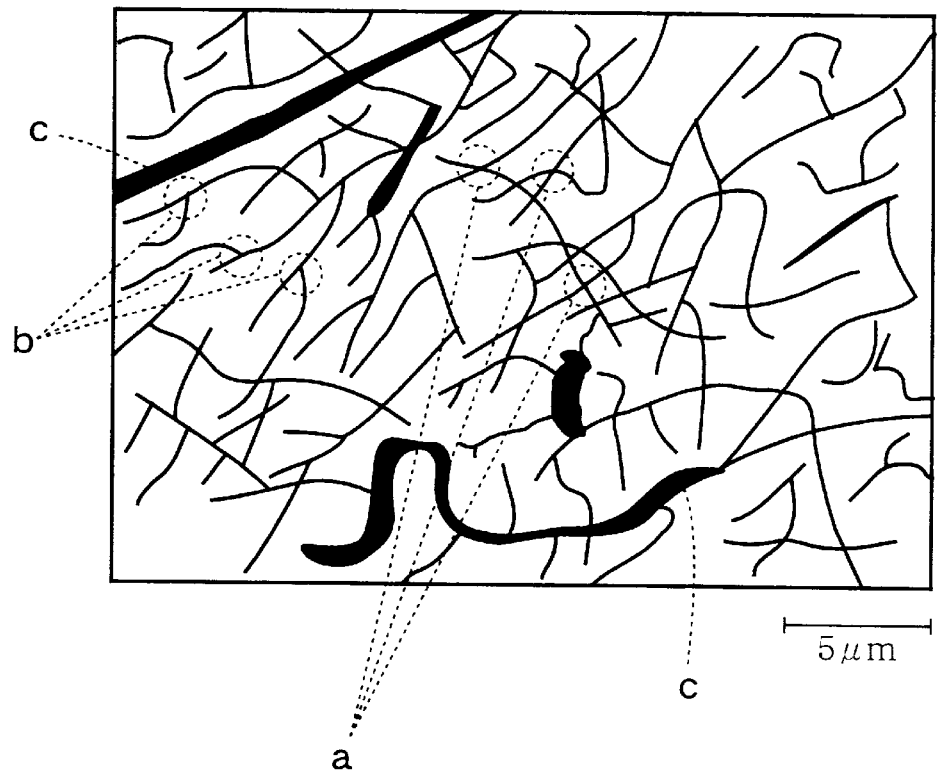
FIG. 1 is a diagrammatic view showing one example of the dispersion morphology of the fluororesin fibrils as observed in a breakage-exposed surface of a broken piece of a test sample obtained from the flame retardant resin composition of the present invention (which breakage-exposed surface of a broken piece is obtained by applying to the test sample a tensile force sufficient to break the molded article), wherein solid lines indicate the fluororesin.

In each of the photomicrographs shown in FIGS. 3 to 9, white portions indicate the fluororesin.

DESCRIPTION OF REFERENCE NUMERALS a: Intersecting point of the fibrils in the network configuration (i.e., a point at which at least two fibrils intersect with each other)
b: Branched point of the fibrils in the branched configuration (i.e., a point at which a fibril branches into at least two fibrils)
c: Fibrils having a diameter of more than 0.5 $\mu$m
1: Hopper of an extruder
2: Pipe (nozzle) equipped with a jacket, through which the aqueous dispersion of a fluororesin is fed to the extruder
3: Opening formed at a position intermediate between both ends of the extruder
4: Screw of the extruder
P: Pump

DETAILED DESCRIPTION OF THE INVENTION

In an aspect of the present invention, there is provided a flame retardant resin composition comprising:
(A) 100 parts by weight of a thermoplastic resin,
(B) 0.01 to 5 parts by weight of a fluororesin, and
(C) 0.1 to 30 parts by weight of a flame retardant,
the fluororesin (B) being present in the form of fibrils, and
the thermoplastic resin (A) and the flame retardant (C) being present in the form of a mixture thereof, and
wherein, when a breakage-exposed surface of a broken piece obtained from a test sample of the resin composition is examined by means of a scanning electron microscope with respect to a predetermined area of 7 $\mu$m×7 $\mu$m wherein the fibrils are dispersed in the entire region of the predetermined area, the dispersed fibrils exhibit a dispersion morphology in which the fibrils have a diameter of 0.5 $\mu$m or less over lengths of the fibrils which lengths correspond to 50% or more of the total length of the fibrils and in which the fibrils have at least one configuration selected from the group consisting of a network configuration comprising one or more intersecting points at which at least two fibrils intersect with each other and a branched configuration comprising one or more branching points at which a fibril branches into at least two fibrils, wherein 5 or more points selected from the group consisting of the intersecting points and the branching points are present in the predetermined area of 7 $\mu$m×7 $\mu$m,
the breakage-exposed surface of the broken piece being obtained by applying to the test sample a tensile force sufficient to break the test sample and form a surface of the resultant broken piece which surface is exposed by breakage, wherein the test sample is prepared by injection molding so as to be used in a flame retardancy test by the Vertical Burning Method described in UL-Subject 94.

For an easy understanding of the present invention, the essential features and various preferred embodiments of the present invention are enumerated below.
1. A flame retardant resin composition comprising:
(A) 100 parts by weight of a thermoplastic resin,
(B) 0.01 to 5 parts by weight of a fluororesin, and
(C) 0.1 to 30 parts by weight of a flame retardant,
the fluororesin (B) being present in the form of fibrils, and
the thermoplastic resin (A) and the flame retardant (C) being present in the form of a mixture thereof, and
wherein, when a breakage-exposed surface of a broken piece obtained from a test sample of the resin composition is examined by means of a scanning electron microscope with respect to a predetermined area of 7 $\mu$m×7 $\mu$m wherein the fibrils are dispersed in the entire region of the predetermined area, the dispersed fibrils exhibit a dispersion morphology in which the fibrils have a diameter of 0.5 µm or less over lengths of the fibrils which lengths correspond to 50% or more of the total length of the fibrils and in which the fibrils have at least one configuration selected from the group consisting of a network configuration comprising one or more intersecting points at which at least two fibrils intersect with each other and a branched configuration comprising one or more branching points at which a fibril branches into at least two fibrils, wherein 5 or more points selected from the group consisting of the intersecting points and the branching points are present in the predetermined area of 7 µm×7 µm, the breakage-exposed surface of the broken piece being obtained by applying to the test sample a tensile force sufficient to break the test sample and form a surface of the resultant broken piece which surface is exposed by breakage, wherein the test sample is prepared by injection molding so as to be used in a flame retardancy test by the Vertical Burning Method described in UL-Subject 94.

2. The resin composition according to item 1 above, wherein the fibrils have a diameter of 0.5 µm or less over lengths of the fibrils which lengths correspond to 70% or more of the total length of the fibrils, and wherein 10 or more points selected from the group consisting of the intersecting points and the branching points are present in the predetermined area of 7 µm×7 µm.

3. The resin composition according to item 1 or 2 above, wherein thermoplastic resin (A) comprises a rubber-reinforced resin (A-d) comprising:

a graft copolymer which is obtained by graft-copolymerizing a rubber polymer with at least one vinyl compound graft-copolymerizable with the rubber polymer, and a vinyl polymer.

4. The resin composition according to item 1 or 2 above, wherein thermoplastic resin (A) comprises:

5 to 98 parts by weight of a polycarbonate resin (A-e), and 95 to 2 parts by weight of a rubber-reinforced resin (A-d), the rubber-reinforced resin (A-d) comprising:

a graft copolymer which is obtained by graft-copolymerizing a rubber polymer with at least one vinyl compound graft-copolymerizable with the rubber polymer, and a vinyl polymer.

5. The resin composition according to item 1 or 2 above, wherein fluororesin (B) is a polytetrafluoroethylene.

6. The resin composition according to item 1 or 2 above, wherein flame retardant (C) is a halogen-containing flame retardant.

7. The resin composition according to item 1 or 2 above, wherein flame retardant (C) is a phosphate flame retardant.

8. The resin composition according to item 1 or 2 above, wherein flame retardant (C) is an oligomeric phosphate flame retardant.

9. A method for producing a flame retardant resin composition comprising 100 parts by weight of a thermoplastic resin, 0.01 to 5 parts by weight of a fluororesin, and 0.1 to 30 parts by weight of a flame retardant, which method comprises:

(1) melt-kneading together 10 to 100 parts by weight of a thermoplastic resin (A) and 0 to 30 parts by weight of a flame retardant (C), thereby forming a melt-kneaded material, and (2) adding 0.01 to 5 parts by weight of a fluororesin (B) to the melt-kneaded material, and melt-kneading together the fluororesin (B) and the melt-kneaded material, thereby forming a fluororesin-containing thermoplastic resin composition, the fluororesin (B) being in the form of an aqueous dispersion thereof in an aqueous dispersion medium, the aqueous dispersion having a fluororesin particle diameter of from 0.05 to 0.5 µm and having a solids content of from 10 to 70% by weight, wherein, when a desired ratio within the component (A)/component (C) weight ratio range of 100/0.1 to 30 is not satisfied with respect to component (A) and component (C) which are melt-kneaded in step (1), at least one component selected from the group consisting of component (A) and component (C) is added, in an amount necessary for satisfying the desired ratio within the component (A)/component (C) weight ratio range of 100/0.1 to 30, to the fluororesin-containing thermoplastic resin composition formed in step (2) in at least one additional subsequent stage, wherein the resultant mixture in each stage is subjected to further melt-kneading.

10. The method according to item 9 above, which is performed by using an extruder having an opening at a position intermediate between both ends of the extruder, wherein the fluororesin (B) in the form of the aqueous dispersion thereof is dropwise fed to the extruder through the opening and melt-kneaded together with the melt-kneaded material formed in step (1), while allowing the aqueous dispersion medium of the aqueous dispersion of fluororesin (B) to evaporate through the opening.

11. A resin composition produced by the method of item 9 or 10 above.

12. A shaped resin article produced from the resin composition of any one of items 1 to 8 and 11 above.

The flame retardant resin composition of the present invention will be described below in detail.

Examples of thermoplastic resins (A) used in the present invention include styrene polymer resins; olefin polymer resins; engineering plastics, such as polyamide resins, oxymethylene polymer resins, phenylene ether polymer resins, polycarbonate resins and polyester resins; and methyl methacrylate polymer resins. These thermoplastic resins may be either homopolymers or copolymers. Further, these resins can be used individually or in combination. Especially preferred examples of thermoplastic resins include styrene polymer resins, polyester resins and polycarbonate resins. Examples of styrene polymer resins include a rubber-modified styrene polymer resin and a rubber-non-modified styrene polymer resin. More preferred examples of thermoplastic resins include a rubber-modified styrene polymer resin {hereinafter, frequently referred to as "rubber-reinforced thermoplastic resin (A-d)"} and a resin composition comprising a rubber-modified styrene polymer resin and a polycarbonate resin {hereinafter, frequently referred to as "polycarbonate resin (A-e)"}.

Examples of vinyl monomers which are used for producing a rubber-modified styrene polymer resin or a rubber-non-modified styrene polymer resin include aromatic vinyl compounds, such as styrene, α-methylstyrene and para-methylstyrene; alkyl (meth)acrylates, such as methyl methacrylate, methyl acrylate, butyl acrylate and ethyl acrylate; (meth)acrylic acids, such as acrylic acid and methacrylic acid; vinyl cyanide monomers, such as acrylonitrile and methacrylonitrile; α, β-unsaturated carboxylic acids, such as maleic anhydride; maleimide monomers, such as N-phenylmaleimide, N-methylmaleimide and N-cyclohexylmaleimide; and glycidyl group-containing monomers, such as glycidyl methacrylate. Of these vinyl monomers, preferred are aromatic vinyl compounds, alkyl (meth)acrylates, vinyl cyanide monomers and maleimide monomers. More preferred are styrene, acrylonitrile, N-phenylmaleimide and butyl acrylate. These vinyl monomers can be used individually or in combination.

A rubber-modified styrene polymer resin used in the present invention comprises an aromatic vinyl polymer as a continuous phase and rubber polymer particles dispersed therein. A rubber-modified styrene polymer resin can be obtained by graft-copolymerizing an aromatic vinyl monomer, and optionally a vinyl monomer copolymerizable with the aromatic vinyl monomer, with a rubbery polymer, using a customary method, such as a bulk polymerization method, a bulk suspension polymerization method, a solution polymerization method or an emulsion polymerization method.

As examples of rubber polymers in the rubber-modified styrene polymer resin, there can be mentioned those having a glass transition temperature of 0° C. or less. Specific examples of rubber polymers include diene rubbers, such as polybutadiene, a styrene-butadiene copolymer rubber and an acrylonitrile-butadiene copolymer rubber; acrylic rubbers, such as polybutyl acrylate; polyisoprene; polychloroprene; an ethylene-propylene rubber; an ethylene-propylene-diene terpolymer rubber; a styrene-butadiene block copolymer rubber; and block copolymers, such as a styrene-isoprene block copolymer rubber; and products obtained by hydrogenating these block copolymers.

Examples of rubber-modified styrene polymer resins include high impact polystyrene, an ABS resin (acrylonitrile/butadiene/styrene copolymer), an AAS resin (acrylonitrile/acrylic rubber/styrene copolymer) and an AES resin (acrylonitrile/ethylene-propylene rubber/styrene copolymer).

A preferred composition of the rubber-reinforced thermoplastic resin (A-d) used in the present invention and a method for producing the rubber-reinforced thermoplastic resin (A-d) are described below.

In the present invention, the rubber-reinforced thermoplastic resin (A-d) comprises a graft copolymer which is obtained by a method comprising grafting on a rubber polymer at least one vinyl compound graft-copolymerizable with the rubber polymer. The rubber-reinforced thermoplastic resin (A-d) may contain a non-grafted vinyl polymer which is formed by the non-graft polymerization of a vinyl compound which occurs simultaneously with the graft-polymerization of the vinyl copolymer for forming of the graft copolymer. Further, in the present invention, the rubber-reinforced thermoplastic resin (A-d) may also contain a vinyl polymer which has been produced separately from the graft copolymer and incorporated into the graft copolymer. In the present invention, it is preferred that at least 1% by weight of the vinyl polymer present in the rubber-reinforced thermoplastic resin (A-d) is grafted on the rubber polymer.

Examples of rubber polymers used in the present invention include polybutadiene, polyisoprene and polychloroprene; conjugated diene rubbers, such as a butadiene-styrene copolymer and a butadiene-acrylonitrile copolymer; ethylene-propylene rubbers; and acrylic rubbers, such as an ethyl acrylate polymer and a butyl acrylate polymer. Of these, preferred are polybutadiene, a butadiene-styrene copolymer and a butadiene-acrylonitrile copolymer, which are conjugated diene rubbers. These rubber polymers can be used in combination.

The content of the rubber polymer in the rubber-reinforced thermoplastic resin (A-d) is from 5 to 65% by weight, preferably from 10 to 60% by weight. When the content of the rubber polymer in the rubber-reinforced thermoplastic resin (A-d) is less than 5% by weight, the resin composition containing such rubber-reinforced thermoplastic resin (A-d) cannot exhibit satisfactory impact resistance. On the other hand, when the content of the rubber polymer in the rubber-reinforced thermoplastic resin (A-d) is more than 65% by weight, the resin composition containing such rubber-reinforced thermoplastic resin (A-d) has disadvantages in that not only is molding melt fluidity poor, but also a molded article produced therefrom has poor luster.

With respect to the particle diameter of the rubber polymer in the rubber-reinforced thermoplastic resin (A-d), there is no particular limitation. The preferred particle diameter of the rubber polymer varies depending on the type of a vinyl polymer, which constitutes the "sea" portion of the rubber-reinforced thermoplastic resin (A-d) having an "island-in-sea" configuration. For example, when the rubber-reinforced thermoplastic resin (A-d) is an ABS resin, it is preferred that the particle diameter of the rubber polymer is from 150 to 600 nm, more preferably from 200 to 500 nm, still more preferably from 250 to 450 nm, as measured before graft polymerization of a vinyl compound. When the particle diameter of the rubber polymer is less than 150 nm, the resin composition cannot exhibit satisfactory impact resistance. Further, when the particle diameter of the rubber polymer is more than 600 nm, the resin composition has a disadvantage in that a molded article produced therefrom has poor luster.

Examples of vinyl compounds graft-copolymerizable with a rubber polymer particle used in the present invention include aromatic vinyl compounds, such as styrene, α-methylstyrene and para-methylstyrene; alkyl (meth)acrylates, such as methyl methacrylate, methyl acrylate, butyl acrylate and ethyl acrylate; (meth)acrylic acids, such as acrylic acid and methacrylic acid; vinyl cyanide monomers, such as acrylonitrile and methacrylonitrile; α, β-unsaturated carboxylic acids, such as maleic anhydride; maleimide monomers, such as N-phenylmaleimide, N-methylmaleimide and N-cyclohexylmaleimide; and glycidyl group-containing monomers, such as glycidyl methacrylate. As the vinyl compound graft-copolymerizable with a rubber polymer particle, preferred are aromatic vinyl compounds, alkyl (meth)acrylates, vinyl cyanide monomers and maleimide monomers. More preferred are styrene, acrylonitrile, N-phenylmaleimide and butyl acrylate.

These vinyl monomers can be used individually or in combination.

Examples of vinyl monomer which can be contained in the rubber-reinforced thermoplastic resin (A-d) include aromatic vinyl compounds, such as styrene, α-methylstyrene and para-methylstyrene; alkyl (meth)acrylates, such as methyl methacrylate, methyl acrylate, butyl acrylate and ethyl acrylate; (meth)acrylic acids, such as acrylic acid and methacrylic acid; vinyl cyanide monomers, such as acrylonitrile and methacrylonitrile; α, β-unsaturated carboxylic acids, such as maleic anhydride; maleimide monomers, such as N-phenylmaleimide, N-methylmaleimide and N-cyclohexylmaleimide; and glycidyl group-containing monomers, such as glycidyl methacrylate. Of these vinyl monomer, preferred are an aromatic vinyl compound, an alkyl (meth)acrylate, a vinyl cyanide monomer and a maleimide monomer. More preferred are styrene, acrylonitrile, N-phenylmaleimide and butyl acrylate.

The above-mentioned vinyl monomers can be used individually or in combination.

With respect to the method for producing the rubber-reinforced thermoplastic resin (A-d) used in the present invention, there is no particular limitation. However, as examples of methods for producing the rubber-reinforced thermoplastic resin (A-d), there can be mentioned an emulsion graft polymerization comprising grafting a vinyl compound on a rubber polymer latex produced by emulsion polymerization, and a two-stage polymerization which comprises producing a reaction mixture containing a graft copolymer produced by the above-mentioned emulsion graft polymerization; consecutively adding a vinyl compound to the reaction mixture; and performing a further graft polymerization of the vinyl compound by solution polymerization or suspension polymerization. Each of such polymerization methods can be conducted in any of a continuous manner, a batchwise manner and a semi-batchwise manner. As a further example of methods for producing the rubber-reinforced thermoplastic resin (A-d), there can be mentioned a method in which: a high rubber content graft copolymer is produced by any of the above-mentioned polymerization methods; a diluent thermoplastic resin is separately produced by bulk polymerization, emulsion polymerization or suspension polymerization, using a raw material comprised mainly of the same vinyl compound as that grafted on the rubber polymer; and the obtained diluent thermoplastic resin is incorporated into the above-mentioned high rubber content graft copolymer so as to adjust the rubber content of the graft copolymer to a desired value.

In the present invention, as a method for producing the rubber-reinforced thermoplastic resin (A-d), it is preferred to employ an emulsion graft polymerization which comprises obtaining a reaction mixture containing a rubber polymer produced by emulsion polymerization and, then, continuously adding a vinyl compound to the reaction mixture containing the produced rubber polymer, together with an initiator, a molecular weight modifier and the like, thereby grafting the vinyl compound on the rubber polymer.

With respect to the pH value of the reaction system for the graft copolymerization, there is no particular limitation. However, from the viewpoint of facilitating the graft copolymerization, it is preferred that the pH of the reaction system for the graft copolymerization falls within the neutral range, i.e., in the range of from 7 to 9.

As an emulsifier used in the emulsion polymerization for producing a rubber-reinforced thermoplastic resin, use can be made of an ordinary emulsifier which is generally used in emulsion polymerization. Examples of such emulsifiers include anionic emulsifiers, such as rosinate, a higher fatty acid salt, an alkyl sulfate salt, an alkylbenzensulfonic acid salt, an alkyldiphenyletherdisulfonic acid salt, a polyoxyethylene alkylphenylethersulfuric acid salt and a dialkylsulfosuccinic acid salt, and nonionic emulsifiers, such as a polyoxyethylene alkylether and a polyoxyethylene alkylphenylether.

In the emulsion polymerization, a radically polymerizable emulsifier having a double bond in the molecule thereof (hereinafter referred to simply as "polymerizable emulsifier") can also be used. The polymerizable emulsifier preferably used in the present invention is selected from among compounds satisfying the following requirements: having both a hydrophilic group and a hydrophobic group in the molecule thereof; having the ability to lower a gas-liquid interfacial tension, a liquid-liquid interfacial tension and a solid-liquid interfacial tension; having at least one double bond in the molecule thereof; and being radically copolymerizable with a conjugated diene rubber, an aromatic vinyl compound, a vinyl cyanide compound and/or a (meth) acrylic ester. The hydrophilic group contained in the polymerizable emulsifier usable in the present invention may be anionic, nonionic or cationic. However, it is preferred that the hydrophilic group of the polymerizable emulsifier is anionic. It is more preferred that the polymerizable emulsifier has both a nonionic hydrophilic group and an anionic hydrophilic group.

As examples of polymerizable emulsifiers there can be mentioned emulsifiers respectively represented by formulae (I) to (VII) shown below. However, the polymerizable emulsifiers usable in the present invention are not limited to those emulsifiers.

As mentioned above, examples of polymerizable emulsifiers include emulsifiers represented by the following formula (I):

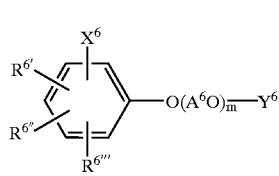

(I)

wherein:
$X^6$ represents a (meth)allyl group, a (meth)acryloyl group or a 1-propenyl group;
$Y^6$ represents a hydrogen atom, a sulfate ester salt-forming group represented by $-SO_3M^6$
wherein $M^6$ represents a hydrogen atom, an alkali metal, an alkaline earth metal, an ammonium group or a $C_1$–$C_4$ hydroxyalkyl ammonium group,
a carboxylic acid salt represented by $-CH_2COOM^6$
wherein $M^6$ represents a hydrogen atom, an alkali metal, an alkaline earth metal, an ammonium group or a $C_1$–$C_4$ hydroxyalkyl ammonium group,
or a phosphoric monoester salt-forming group represented by the following formula (I'):

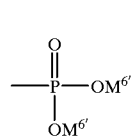

(I')

wherein each $M^{6'}$ independently represents a hydrogen atom, an alkali metal, alkaline earth metal, an ammonium group
or a $C_1$–$C_4$ hydroxyalkyl ammonium group;
$R^{6'}$ represents a $C_1$–$C_{18}$ alkyl group, an alkenyl group or an aralkyl group;
$R^{6''}$ represents a hydrogen atom, a $C_1$–$C_{18}$ alkyl group, an alkenyl group or an aralkyl group;
$R^{6'''}$ represents a hydrogen atom or a propenyl group;
$A^6$ represents an unsubstituted or substituted $C_2$–$C_4$ alkylene group; and
m represents an integer of from 1 to 200.

As mentioned above, as further examples of polymerizable emulsifiers preferably used in the present invention, there can be mentioned (meth)allylglycerylether derivatives and (meth)acrylglycerylester derivatives both represented by the following formula (II):

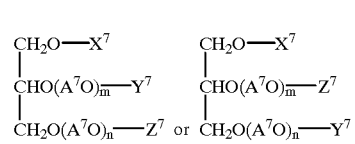

(II)

wherein:
$X^7$ represents a (meth)allyl group or a (meth)acryloyl group;
$Y^7$ represents a hydrogen atom, a sulfate ester salt-forming group represented by $-SO_3M^7$
wherein $M^7$ represents a hydrogen atom, an alkali metal, an alkaline earth metal, an ammonium group or a $C_1$–$C_4$ hydroxyalkyl ammonium group, a carboxylic acid salt represented by —CH$_2$COOM$^{7'}$
wherein M$^{7'}$ represents a hydrogen atom, an alkali metal or an alkaline earth metal,
a phosphoric monoester salt-forming group represented by formula (I') above, or a group represented by the following formula (I''):

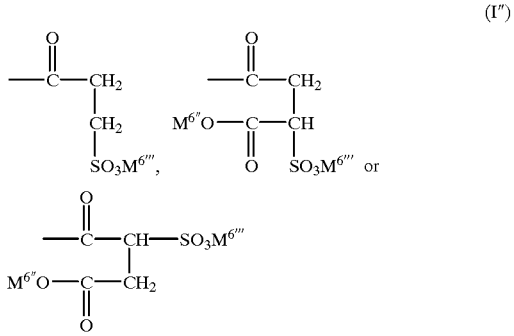

wherein M$^{6''}$ represents a hydrogen atom, an alkali metal, an alkaline earth metal, an ammonium group, a C$_1$–C$_4$ hydroxyalkyl ammonium group or a C$_8$–C$_{30}$ alkyl group which optionally has a C$_2$–C$_4$ alkylene oxide unit; and M$^{6'''}$ represents a hydrogen atom, an alkali metal, an alkaline earth metal, an ammonium group, or a C$_1$–C$_4$ hydroxyalkyl ammonium group;

Z$^7$ represents an unsubstituted or substituted C$_8$–C$_{30}$ alkyl group, an unsubstituted or substituted alkenyl group, an unsubstituted or substituted alkylaryl group, an unsubstituted or substituted aralkylaryl group, or an unsubstituted or substituted acyl group;

A$^7$ represents an unsubstituted or substituted C$_2$–C$_4$ alkylene group;

m represents an integer of from 0 to 100; and n represents an integer of from 0 to 50.

As mentioned above, as still further examples of polymerizable emulsifiers preferably used in the present invention, there can be mentioned succinic acid derivatives represented by the following formula (III):

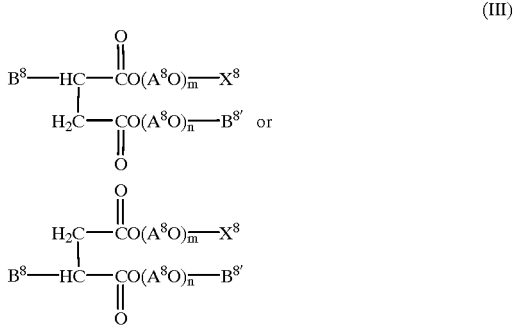

wherein:
X$^8$ represents a (meth)allyl group or a (meth)acryloyl group;
each of B$^8$ and B$^{8'}$ represents the following group Y$^8$ or Z$^8$ wherein Y$^8$ represents M$^8$ or a sulfate ester salt-forming group represented by —SO$_3$M$^8$
wherein M$^8$ represents a hydrogen atom, an alkali metal, an alkaline earth metal, an ammonium group or a C$_1$–C$_4$ hydroxyalkyl ammonium group, and
Z$^8$ represents a C$_8$–C$_{30}$ alkyl group or an alkenyl group, provided that B$^8$ and B$^{8'}$ are different from each other;

A$^8$ represents an unsubstituted or substituted C$_2$–C$_4$ alkylene group; and
each of m and n independently represents an integer of from 0 to 50.

As mentioned above, as still further examples of polymerizable emulsifiers preferably used in the present invention, there can be mentioned emulsifiers represented by the following formula (IV):

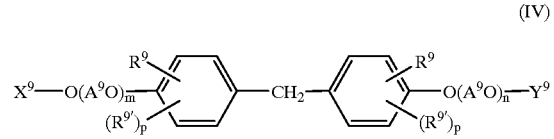

wherein:
X$^9$ represents a (meth)allyl group or a (meth)acryloyl group;
Y$^9$ represents a hydrogen atom, a sulfate ester salt-forming group represented by —SO$_3$M$^9$
wherein M$^9$ represents a hydrogen atom, an alkali metal, an alkaline earth metal, an ammonium group or a C$_1$–C$_4$ hydroxyalkyl ammonium group,
or a carboxylic acid salt represented by —CH$_2$COOM$^9$
wherein M$^9$ represents a hydrogen atom, an alkali metal, an alkaline earth metal, an ammonium group or a C$_1$–C$_4$ hydroxyalkyl ammonium group;
each R$^9$ independently represents a hydrogen atom or a C$_1$–C$_{25}$ alkyl group;
each R$^{9'}$ independently represents a C$_1$–C$_{25}$ alkyl group, a benzyl group or a styryl group;
p represents an integer of from 0 to 2;
A$^9$ represents an unsubstituted or substituted C$_2$–C$_4$ alkylene group; and
each of m and n independently represents an integer of from 0 to 50.

As mentioned above, as still further examples of polymerizable emulsifiers preferably used in the present invention, there can be mentioned (meth)allylether derivatives and (meth)acrylester derivatives both represented by the following formula (V):

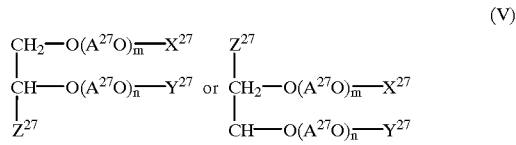

wherein:
X$^{27}$ represents a (meth)allyl group or a (meth)acryloyl group;
Y$^{27}$ represents a hydrogen atom, a methyl group, a sulfate ester salt-forming group represented by —SO$_3$M$^{27}$
wherein M$^{27}$ represents a hydrogen atom, an alkali metal, an alkaline earth metal, an ammonium group or a C$_1$–C$_4$ hydroxyalkyl ammonium group,
a carboxylic acid salt represented by —CH$_2$COOM$^{27}$
wherein M$^{27}$ represents a hydrogen atom, an alkali metal and an alkaline earth metal, an ammonium group or a C$_1$–C$_4$ hydroxyalkyl ammonium group,
or a phosphoric monoester salt-forming group represented by formula (I') above;
Z$^{27}$ represents a C$_8$–C$_{30}$ alkyl group;

$A^{27}$ represents an unsubstituted or substituted $C_2$–$C_4$ alkylene group;

m represents an integer of from 0 to 20; and n represents an integer of from 0 to 50.

As mentioned above, as still further examples of polymerizable emulsifiers preferably used in the present invention, there can be mentioned diol compounds represented by the following formula (VI):

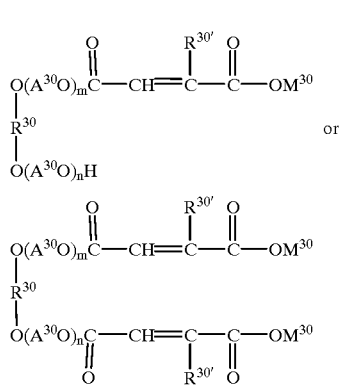
(VI)

wherein $A^{30}$ represents a $C_2$–$C_4$ alkylene group; $R^{30}$ represents a $C_8$–$C_{24}$ hydrocarbon group; $R^{30'}$ represents a hydrogen atom or a methyl group; each of m and n independently represents an integer of from 0 to 100, provided that the sum of m and n is in the range of from 0 to 100; and $M^{30}$ represents a hydrogen atom, an alkali metal, an alkaline earth metal, an ammonium group or a $C_1$–$C_4$ hydroxyalkyl ammonium group.

As mentioned above, as still further examples of polymerizable emulsifiers preferably used in the present invention, there can be mentioned compounds represented by the following formula (VII):

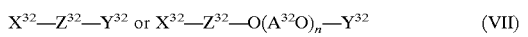
(VII)

wherein:

$X^{32}$ represents a (meth)allyl group, a (meth)allyloxy group, a (meth)acryloyl group, (meth)acryloyloxy group or a group represented by the following formula (VII'):

(VII')

wherein each of $R^{32'}$ and $R^{32''}$ independently represents a hydrogen atom or a methyl group;

$Y^{32}$ represents a hydrogen atom, a sulfate ester salt-forming group represented by —$SO_3M^{32}$ wherein $M^{32}$ represents a hydrogen atom, an alkali metal, an alkaline earth metal, an ammonium group or a $C_1$–$C_4$ hydroxyalkyl ammonium group, a carboxylic acid salt represented by —$CH_2COOM^{32}$ wherein $M^{32}$ represents a hydrogen atom, an alkali metal and an alkaline earth metal, an ammonium group or a $C_1$–$C_4$ hydroxyalkyl ammonium group, a phosphoric monoester salt-forming group represented by formula (I') above, or a sulfosuccinic acid monoester salt-forming group represented by formula (I'') above;

$Z^{32}$ represents an unsubstituted or substituted $C_6$–$C_{30}$ alkylene group;

$A^{32}$ represents an unsubstituted or substituted $C_2$–$C_4$ alkylene group; and each of m and n independently represents an integer of from 0 to 50.

As an example of polycarbonate resin (A-e) used in the present invention, there can be mentioned an aromatic polycarbonate resin. The aromatic polycarbonate resin can be selected from a resin prepared by a polymerization method in which an aromatic dihydroxy compound and phosgene are reacted with each other in a homogeneous system or in a heterogeneous system (i.e., two-phase interfacial polymerization) and a resin obtained by melt transesterification method in which an aromatic dihydroxy compound and dicarbonate are reacted with each other in a molten state. As an aromatic dihydroxy compound used for preparing polycarbonate resin (A-e), bisphenols are preferred. Of these, 2,2-bis(4-hydroxyphenyl)propane (hereinafter, frequently referred to simply as "bisphenol A") is especially preferred. A part or all of bisphenol A may be replaced by other divalent phenol compounds. Examples of aromatic dihydroxy compounds other than bisphenol A include hydroquinone, 4,4-dihydroxydiphenyl, bis(4-hydroxyphenyl)sulfide, bis(4-hydroxyphenyl)sulfone and bis(4-hydroxyphenyl)ketone. Still further, aromatic dihydroxy compounds may be homopolymers or copolymers comprising these aromatic dihydroxy compounds, or blends comprising the homopolymers and/or copolymers.

Examples of dicarbonates used in the melt transesterification include diaryl carbonates, and diphenyl carbonate is especially preferred.

A multifunctional compound having 3 or more functional groups can be incorporated into the aromatic polycarbonates in a small amount such that the desired effects of the resin composition of the present invention are not sacrificed, to thereby introduce the branched structures into the resin composition obtained using such aromatic polycarbonates. As an example of a multifunctional compound incorporated into the aromatic polycarbonates, there can be mentioned a polyphenol.

It is preferred that the weight average molecular weight of polycarbonate resin (A-e) used in the present invention is in the range of from 5,000 to 300,000. When the weight average molecular weight of polycarbonate resin (A-e) is less than 5,000, the resin composition containing such a polycarbonate resin cannot exhibit satisfactory mechanical strength. On the other hand, when the weight average molecular weight of polycarbonate resin (A-e) is more than 300,000, the resin composition containing such a polycarbonate resin has a disadvantage in that the molding melt fluidity thereof is poor. Further, the weight average molecular weight of polycarbonate resin (A-e) is more preferably in the range of from 7,000 to 100,000, still more preferably from 10,000 to 80,000.

With respect to the terminal molecular structure of the polycarbonate, there is no particular limitation. However, the polycarbonate used in the present invention may contain one or more terminal groups selected from the group consisting of a hydroxyl group, an arylcarbonate group and an alkylcarbonate group. The hydroxyl group at the terminals of the polycarbonate is derived from an aromatic dihydroxy compound used for obtaining the polycarbonate. The polycarbonate used in the present invention contains the hydroxyl group at least at one terminal thereof in the range of from about 0 to 50%, based on the total number of the terminal groups contained in the polycarbonate.

In the present invention, a resin composition comprising polycarbonate (A-e) and rubber-reinforced resin (A-d) is especially preferred as a thermoplastic resin (A). With respect to the proportion of polycarbonate resin (A-e) and rubber-reinforced resin (A-d) contained in thermoplastic resin (A), it is preferred that the amount of rubber-reinforced resin (A-d) is in the range of from 5 to 98 parts by weight while the amount of polycarbonate resin (A-e) is in the range of from 95 to 2 parts by weight. It is more preferred that the amount of rubber-reinforced resin (A-d) is in the range of from 80 to 10 parts by weight, while the amount of polycarbonate resin (A-e) is in the range of from 20 to 90 parts by weight. It is still more preferred that the amount of rubber-reinforced resin (A-d) is in the range of from 60 to 15 parts by weight, while the amount of polycarbonate resin (A-e) is in the range of from 40 to 85 parts by weight.

Fluororesin (B) exists in the form of fibrils in the resin composition of the present invention. The fibrils have a diameter of 0.5 μm or less and have a network configuration and/or branched configuration. Fluororesins used are generally selected from a group consisting of perfluoroalkane resins, such as a polytetrafluoroethylene (PTFE) and an ethylene-propylene fluoride (FEP) resin; and a perfluoroalkoxy (PFA) resin. Of these, PTFE is especially preferred.

It is preferred that the amount of fluororesin (B) in the resin composition of the present invention is from 0.01 to 5 parts by weight, relative to 100 parts by weight of thermoplastic resin (A). When the amount of fluororesin (B) is less than 0.01 part by weight, the dripping-preventive property of the resin composition is unsatisfactory. When the amount of fluororesin (B) is more than 5 parts by weight, the mechanical strength of the resin composition lowers and the moldability of the resin composition becomes poor. Further, the amount of fluororesin (B) is more preferably from 0.02 to 2 parts by weight, most preferably from 0.1 to 1 part by weight.

Specifically, the dispersion morphology of fluororesin (B) in the form of fibrils in the resin composition of the present invention is examined by the method mentioned below. A test sample of the resin composition is prepared by injection molding so as to be used in a flame retardancy test by the Vertical Burning Method described in UL-Subject 94. A tensile force sufficient to break the test sample is applied to the test sample to thereby obtain a breakage-exposed surface of a broken piece. The obtained breakage-exposed surface is examined by means of a scanning electron microscope (SEM) to confirm that the fibrils have the dispersion morphology which satisfies the requirement of the present invention as mentioned above. With respect to the conditions for the examination of the dispersion morphology of the fluororesin fibrils by means of SEM, there is no particular limitation as long as the above-mentioned conditions are satisfied. For example, when a resin composition comprising rubber-reinforced resin (A-d) and polycarbonate resin (A-e) is used as thermoplastic resin (A), the examination of the dispersion morphology of the fluororesin fibrils by means of SEM is practically determined under the following conditions.

Injection molding machine: M-JEC10 (manufactured and sold by Modern Machinery Co., Japan)
  Molding temperature: 260° C.
  Mold temperature: 60° C.
  Injection speed: 500 (set speed)
  Size of test piece: ½ inch×5 inches×1/16 inch
(Preparation of broken piece for use in examination under SEM)
  Using a tensile testing machine (Autograph 5000D, manufactured and sold by Shimadzu Corporation, Japan), the test piece described above was subjected to tensile testing at a tensile speed (moving speed of grip) of 5 mm/minute until the test piece was broken, to thereby obtain a broken piece for use in the examination under SEM.
(Examination under SEM)
  Preliminary treatment: The breakage-exposed surface of the broken piece as described above was subjected to gold vacuum deposition so that the thickness of the resultant gold deposition became 200 angstroms or more. (Apparatus for deposition: JFC 1500 QUICK AUTO COATER, manufactured and sold by JEOL LTD., Japan)
  Examination under SEM: The SEM examination of the pretreated breakage-exposed surface of the broken piece was conducted by using the following apparatus. Apparatus : JSM-5300 (manufactured and sold by JEOL LTD., Japan)
  Accelerating voltage: 15 kV The dispersion morphology in which the dispersed fluororesin fibrils have a network configuration and/or a branched configuration is described below with reference to the accompanying FIG. 1 and FIGS. 3 to 9. FIG. 1 is a diagrammatic view showing one example of the dispersion morphology of the dispersed fluororesin fibrils in the resin composition of the present invention, and FIGS. 3 to 9 are scanning electron photomicrographs showing various examples of the dispersion morphologies of the dispersed fluororesin fibrils. In FIG. 1, the solid lines indicate the fluororesin. In each of FIGS. 3 to 9, white portions indicate the fluororesin.

As mentioned above, in the present invention, it is requisite to satisfy the following requirements. Particularly, a breakage-exposed surface of a broken piece obtained from a test sample of the resin composition of the present invention is examined by means of a scanning electron microscope with respect to a predetermined area of 7 μm×7 μm wherein the fibrils are dispersed in the entire region of the predetermined area, the dispersed fibrils exhibit a dispersion morphology in which the fibrils have a diameter of 0.5 μm or less over lengths of the fibrils which lengths correspond to 50% or more of the total length of the fibrils and in which the fibrils have at least one configuration selected from the group consisting of a network configuration comprising one or more intersecting points at which at least two fibrils intersect with each other and a branched configuration comprising one or more branching points at which a fibril branches into at least two fibrils, wherein 5 or more points selected from the group consisting of the intersecting points and the branching points are present in the predetermined area of 7 μm×7 μm, the breakage-exposed surface of the broken piece being obtained by applying to the test sample a tensile force sufficient to break the test sample and form a surface of the resultant broken piece which surface is exposed by breakage, wherein the test sample is prepared by injection molding so as to be used in a flame retardancy test by the Vertical Burning Method described in UL-Subject 94.

It is requisite that the fluororesin fibrils have a diameter of 0.5 μm or less over lengths of the fibrils which lengths correspond to 50% or more of the total length of the fibrils. Fluororesin fibrils having a diameter of more than 0.5 μm as represented by, for example, character "c" in FIG. 1 can be present in the resin composition. However, as shown in, for example, FIG. 6 which is a scanning electron photomicrograph of a breakage-exposed surface of a tensile force-broken piece of a test sample obtained by molding the resin composition of the present invention, it is requisite that the fluororesin fibrils have a diameter of 0.5 μm or less over lengths of the fibrils which lengths correspond to 50% or more, preferably 70% or more, more preferably 90% or more, of the total length of the fibrils. When the fluororesin fibrils have a diameter of 0.5 μm or less over length of the fibrils which lengths correspond to less than 50% of the total length of the fibrils, the resin composition having such a dispersion morphology cannot achieve an excellent dripping-preventive property.

In the present invention, the term "network configuration" means a configuration comprising one or more intersecting points at which at least two fibrils intersect with each other. Such an intersecting point is indicated by character "a" in the diagrammatic view of the dispersion morphology shown in FIG. 1. The term "branched configuration" means a configuration comprising one or more branching points at which a fibril is branched into at least two fibrils. Such a branching point is indicated by character "b" in the diagrammatic view of the dispersion morphology shown in FIG. 1. Both the fibrils having the network configuration and that having the branched configuration have a three dimensional structure. It is requisite that 5 or more points selected from the group consisting of the intersecting points and the branching points be present in the predetermined area of 7 μm×7 μm. When the number of the points selected from the group consisting of the intersecting points and the branching points present in the predetermined area of 7 μm×7 μm is less than 5, the resin composition having such a dispersion morphology cannot achieve an excellent dripping-preventive property.

When the fluororesin fibrils in the resin composition exhibits the above-mentioned specific dispersion morphology in the predetermined area of 7 μm×7 μm as examined under a SEM, it is suggested that the dispersed fluororesin fibrils are present in high density in the resin composition.

The presence of the dispersed fluororesin fibrils in high density is presumed to cause three-dimensional shrinkage of the fibrils in a shaped article upon burning, resulting in an excellent dropping-preventive property of resin composition.

A fluororesin used in the present invention is produced by suspension polymerization or emulsion polymerization as described in "Fusso Jushi Hando Bukku (Fluororesin Hand Book)" (published in 1990 by the Nikkan Kogyo Shimbun Ltd., Japan). In the present invention, it is preferred to use a fluororesin produced by emulsion polymerization. The fluororesin may be used in the form of a fine fluororesin powder or in the form of an aqueous fluororesin dispersion. The former can be produced by a method in which a fluororesin latex is prepared by emulsion polymerization using water as a dispersion medium, and then, the prepared latex is coagulated and dried. The latter can be produced by a method in which the above-prepared latex is concentrated and stabilized. An aqueous fluororesin aqueous dispersion is commercially available. Examples of commercially available aqueous fluororesin dispersions include PTFE dispersions. As specific examples of PTFE dispersions, there can be mentioned Teflon 30-J (trade name, manufactured and sold by Du Pont-Mitsui Fluorochemicals Co., Ltd., Japan) (solids content: 60% by weight; fluororesin particle diameter: 0.23 μm; surfactant content: 6% by weight, based on the weight of PTFE; pH value: 9–10) and POLYFLON TFE dispersion D-1 (trade name, manufactured and sold by Daikin Industries Ltd., Japan) (solids content: about 60% by weight; fluororesin particle diameter: 0.20–0.40 μm; pH value: 9–10).

In the present invention, use of an aqueous fluororesin dispersion is especially preferred. It is preferred that the solids content of the aqueous fluororesin dispersion is from 10 to 70% by weight. In general, the solids content of a commercially available fluororesin dispersion is about 60% by weight, but the commercially available fluororesin dispersion can be diluted with water or concentrated so that the solids content thereof is adjusted to a desired value prior to its use.

A fluororesin used in the present invention must be present in the form of fibrils having a network configuration and/or branched configuration upon being melt-kneaded with a thermoplastic resin and a flame retardant. Therefore, fluororesins having the ability to form fibrils must be used in the present invention. Such fluororesins are described in U.S. Pat. Nos. 3,005,795, 3,671,487 and 4,463,130.

In the present invention, as the flame retardant (C), there can be used conventional flame retardants. Examples of flame retardants include phosphorus-containing compounds; halogen-containing organic compounds; nitrogen-containing organic compounds, such as a melamine; inorganic compounds, such as magnesium hydroxide, aluminum hydroxide, antimony oxides, and bismuth oxides. As further examples of flame retardants, there can be mentioned metal oxides, such as zinc oxide and tin oxide; red phosphorus; inorganic phosphorus compounds, such as phosphine, hypophosphorous acid, phosphorous acid, metaphosphoric acid, pyrophosphoric acid and phosphoric anhydride; inorganic fibers, such as a carbon fiber and a glass fiber; expanded graphite; silica; and fused silica glass. Of these, preferred are phosphorus-containing compounds, halogen-containing organic compounds, and a combination of a halogen-containing organic compound and antimony oxide. In addition, phosphate flame retardants and oligomeric phosphates may be mentioned.

As the halogen-containing organic compound, use can be made of any compound selected from conventional halogen-containing organic compounds which are generally used as flame retardants and halogen-containing phosphates. Examples of halogen-containing organic compounds include hexachloropentadiene, hexabromodiphenyl, octabromophenyl oxide, tribromophenoxymethane, decabromodiphenyl, decabromodiphenyl oxide, octabromodiphenyl oxide, tetrabromo bisphenol A, tetrabromophthalimide, hexabromobutene and hexabromocyclododecane. Of these, preferred is a halogen-containing organic compound represented by the following formula (1):

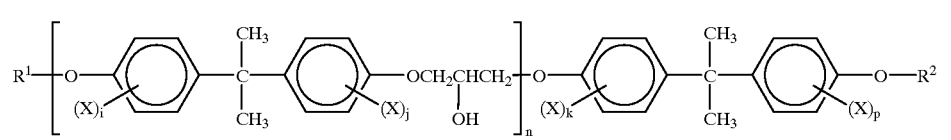

(1)

wherein n represents zero or a natural number, each X independently represents a chlorine atom or a bromine atom, each of i, j, k and p independently represents an integer of from 1 to 4, each of $R^1$ and $R^2$ independently represents a hydrogen atom, a methyl group, an epoxypropyl group represented by the following formula:

a phenyl group or a group represented by the following formula:

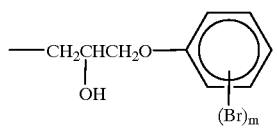

wherein m represents 0, 1, 2 or 3.

An especially preferred halogen-containing organic compound is represented by the following formula (2):

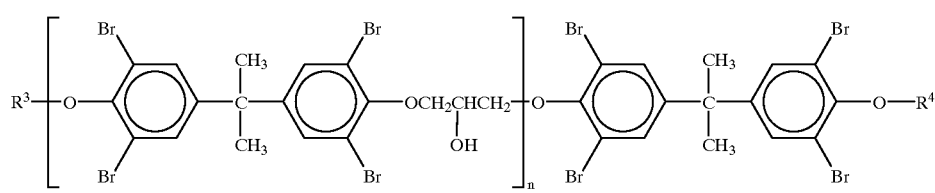

wherein n represents zero or a natural number, each of $R^3$ and $R^4$ independently represents an epoxypropyl group represented by the above formula, a phenyl group or a group represented by the following formula (4):

(4)

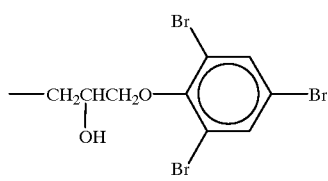

wherein m represents 0, 1, 2 or 3.

On the other hand, examples of halogen-containing phosphates usable as a flame retardant in the present invention include: tris(chloroethyl)phosphate, tris(dichloropropyl) phosphate, tris(β-chloropropyl)phosphate, tris (tribromophenyl)phosphate, tris(dibromophenyl)phosphate, tris(tribromoneopentylphosphate) and oligomeric phosphates derived therefrom. Of these, preferred are tris (tribromoneopentylphosphate), tris(tribromophenyl) phosphate and tris(dibromophenyl)phosphate. These halogen-containing organic compounds can be used individually or in combination.

Examples of phosphate flame retardants include phosphates, such as trimethylphosphate, triethylphosphate, tripropylphosphate, tributylphosphate, tripentylphosphate, trihexylphosphate, tricyclohexylphosphate, triphenylphosphate, tricresylphosphate, trixylenylphosphate, dimethylethylphosphate, methyldibutylphosphate, ethyldipropylphosphate and hydroxyphenyldiphenylphosphate; and compounds obtained by modifying the above-mentioned phosphates with various substituents.

Oligomeric phosphates usable in the polycarbonate resin composition of the present invention are represented by the following formula (5):

(5)

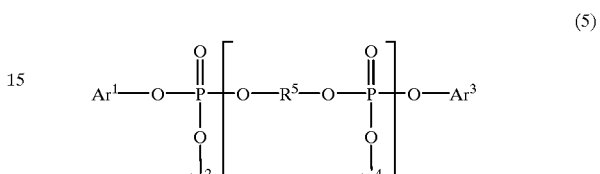

wherein n represents an integer of from 1 to 10; each of $Ar_1$, $Ar^2$, $Ar^3$ and $Ar^4$ independently represents a phenyl group, a tolyl group or a xylyl group, provided that, when n is 2 or more, $Ar^4$s may be the same or different;

and $R^5$ represents a group selected from the following formulae A1 to A4:

(A1)

(A2)

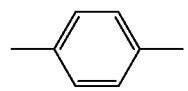

(A3)

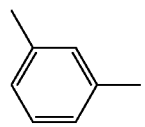

(A4)

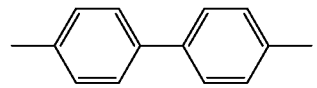

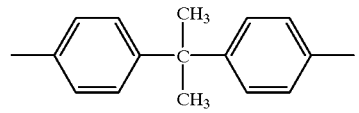

Among the oligomeric phosphates represented by formula (5) above, preferred are those which are represented by the following formulae (6) to (9):

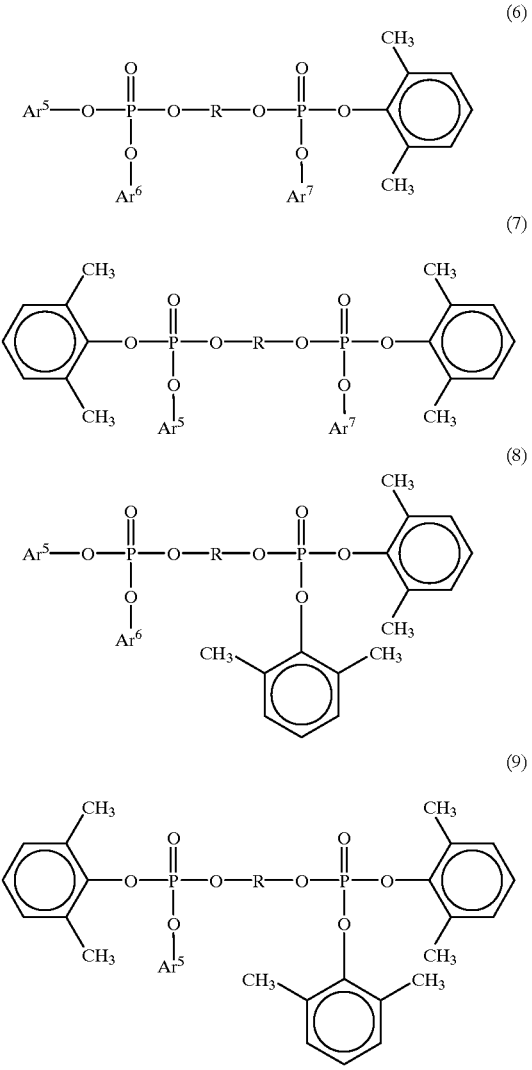

wherein each of $Ar^5$, $Ar^6$ and $Ar^7$ independently represents a phenyl group, a tolyl group or a xylyl group other than a 2,6-xylyl group; and R is a group represented by formula A4 above.

These phosphates are especially effective for imparting high flame retardancy and high heat resistance to the polycarbonate resin composition of the present invention.

The above-mentioned flame retardants can be used individually or in combination.

The amount of a flame retardant in the resin composition of the present invention is selected in accordance with the desired level of flame retardancy for the resin composition. However, it is preferred that the amount of a flame retardant in the resin composition of the present invention is from 0.1 to 30 parts by weight, relative to 100 parts by weight of thermoplastic resin (A). When the amount of a flame retardant is less than 0.1 part by weight, the effect of the flame retardant is unsatisfactory. When the amount of a flame retardant is more than 30 parts by weight, the mechanical strength of the resin composition lowers. The amount of the flame retardant is more preferably from 1 to 25 parts by weight, most preferably from 3 to 22 parts by weight, relative to 100 parts by weight of thermoplastic resin (A).

When a halogen-containing compound is used as a flame retardant, the resin composition of the present invention may also contain a flame retardant auxiliary for enhancing the effect of the flame retardant. A compound preferably usable as a flame retardant auxiliary is a compound containing an element belonging to Group V of the Periodic Table. Specifically, a nitrogen-containing compound, a phosphorus-containing compound, an antimony oxide and a bismuth oxide can be mentioned as preferred examples of flame retardant auxiliaries. Metal oxides, such as iron oxide, zinc oxide or tin oxide, are also effective as a flame retardant auxiliary. Of these compounds, an antimony oxide, such as diantimony trioxide or diantimony pentoxide, is most preferred. These flame retardant auxiliaries may be subjected to a surface treatment for improving the dispersion properties thereof in the resin composition and/or improving the thermal stability of the resin composition containing such a flame retardant auxiliary.

The amount of a flame retardant auxiliary in the resin composition is preferably from 0.5 to 20 parts by weight, relative to 100 parts of thermoplastic resin (A). When the amount of the flame retardant auxiliary is less than 0.5 part by weight, the effect of the flame retardant auxiliary is unsatisfactory. When the amount of the flame retardant auxiliary is more than 20 parts by weight, the mechanical strength of the resin composition lowers and the moldability of the resin composition becomes poor. The amount of the flame retardant auxiliary is more preferably from 1 to 15 parts by weight, most preferably from 1 to 10 parts by weight, relative to 100 parts by weight of thermoplastic resin (A).

The method for producing a flame retardant resin composition of the present invention which has a desired dispersion morphology of fluororesin fibrils can be performed, for example, as follows. When a fluororesin in the form of a fine powder is used, a fine fluororesin powder prepared by pulverizing a fluororesin under conditions (wherein the temperature of the fluororesin does not become higher than $-20°$ C.) is blended with the remaining components (which have been cooled) at a temperature of $10°$ C. or less, followed by melt-kneading. However, it is preferred to employ the following method, which comprises melt-kneading a part or all of a desired amount of a thermoplastic resin, except for a fluororesin (fine fluororesin powder, aqueous fluororesin dispersion or the like), and, if desired, a part or all of a desired amount of a flame retardant, and subsequently adding to the resultant melt-kneaded material the fluororesin, followed by melt-kneading.

Most preferably, a fluororesin in the form of an aqueous dispersion thereof is added to the above-mentioned melt-kneaded material (comprised mainly of the thermoplastic resin). It is presumed that, by the use of an aqueous fluororesin dispersion, latex particles of fluororesin are uniformly dispersed in the melt-kneaded thermoplastic resin to suppress coagulation of the latex particles of fluororesin, so that the formation of uniform fibrils of fluororesin in the mixture of the above-mentioned melt-kneaded thermoplastic resin and the fluororesin can be promoted by a shearing force exerted by a further melt-kneading, thereby enabling the fluororesin dispersion morphology (comprising a network configuration and/or a branched configuration) to be easily formed.

A preferred method for producing the flame retardant resin composition of the present invention will now be further illustrated in more detail.

When the desired flame retardant resin composition comprises 100 parts by weight of a thermoplastic resin, 0.01 to 5 parts by weight of a fluororesin and 0.1 to 30 parts by weight of a flame retardant, the desired flame retardant resin composition can be obtained by the following method. First, 10 to 100 parts by weight of thermoplastic resin (A) and 0 to 30 parts by weight of flame retardant (C) are melt-kneaded to obtain a melt-kneaded material (comprised mainly of the thermoplastic resin). Subsequently, 0.01 to 5 parts by weight of fluororesin (B) is added to the melt-kneaded material obtained above and melt-kneaded together. When a desired ratio within the component (A)/component (C) weight ratio range of 100/0.1 to 30 is not satisfied with respect to component (A) and component (C) which are melt-kneaded above, component (A) and/or component (C) is further added in an amount necessary for satisfying the desired ratio within the component (A)/component (C) weight ratio range of 100/0.1 to 30 in at least one additional subsequent stage, wherein the resultant mixture in each stage is subjected to further melt-kneading.

Thus, according to the present invention, there is provided a method for producing a flame retardant resin composition comprising 100 parts by weight of a thermoplastic resin, 0.01 to 5 parts by weight of a fluororesin, and 0.1 to 30 parts by weight of a flame retardant, which method comprises:

(1) melt-kneading together 10 to 100 parts by weight of a thermoplastic resin (A) and 0 to 30 parts by weight of a flame retardant (C), thereby forming a melt-kneaded material, and (2) adding 0.01 to 5 parts by weight of a fluororesin (B) to the melt-kneaded material, and melt-kneading together the fluororesin (B) and the melt-kneaded material, thereby forming a fluororesin-containing thermoplastic resin composition, the fluororesin (B) being in the form of an aqueous dispersion thereof in an aqueous dispersion medium, the aqueous dispersion having a fluororesin particle diameter of from 0.05 to 0.5 $\mu$m and having a solids content of from 10 to 70% by weight, wherein, when a desired ratio within the component (A)/component (C) weight ratio range of 100/0.1 to 30 is not satisfied with respect to component (A) and component (C) which are melt-kneaded in step (1), at least one component selected from the group consisting of component (A) and component (C) is added, in an amount necessary for satisfying the desired ratio within the component (A)/component (C) weight ratio range of 100/0.1 to 30, to the fluororesin-containing thermoplastic resin composition formed in step (2) in at least one additional subsequent stage, wherein the resultant mixture in each stage is subjected to further melt-kneading.

With respect to the method for melt-kneading the components for the resin composition, conventional melt-kneading methods can be employed. For example, first, components, except a fluororesin, for the resin composition are homogeneously mixed using a Henschel mixer, a super mixer, a tumbling mixer, a ribbon blender or the like, and melt-kneaded using a single-screw extruder, a twin-screw extruder, a Banbury mixer or the like to form a melt-kneaded material comprised mainly of a thermoplastic resin, and an aqueous fluororesin dispersion is added to the above-obtained melt-kneaded material, followed by further melt-kneading, thereby obtaining a flame retardant resin composition of the present invention.

In the production of the flame retardant resin composition of the present invention, as long as the effects of the present invention are not adversely influenced, use may be made of conventional additives. Examples of additives include a stabilizer, such as an antioxidant and a UV light absorber; a lubricant; a mold release agent; an antistatic agent; a colorant and a filler. Especially preferred examples of additives include a phosphorus stabilizer, such as a phosphorus antioxidant and a phosphorus thermal stabilizer. The phosphorus stabilizer can be added in either case before and after the addition of the fluororesin. If desired, fillers may be used. Examples of fillers usable in the resin composition of the present invention include a glass fiber, glass flake, carbon fiber, talc and mica. The types of the fillers used in the present invention may be selected in accordance with the mechanical strength, stiffness, moldability and heat resistance which are required in the use of the resin composition. The amount of a filler in the resin composition is selected in the range of from 0 to 50 parts by weight, relative to 100 parts by weight of thermoplastic resin (A).

As a specific example of methods for the addition of the fluororesin to the melt-kneaded material formed in step (1) of the method used in the present invention, in the case where the melt-kneading in each of steps (1) and (2) is conducted using an extruder, there can be mentioned a method using an extruder having a nozzle (for the liquid additives) at a position intermediate both ends of the extruder. In this method, the aqueous dispersion of the fluororesin is injected into the extruder though the nozzle by means of a pump. Examples of pumps usable in the above method include a tube pump, a gear pump and a plunger pump. With respect to the aqueous dispersion of the fluororesin, for preventing the occurrence of coagulation of the fluororesin during the injection of the dispersion from the pump to the extruder, it is preferred that dispersion is cooled prior to use and that a tube pump is used as the pump.

Figure 2:
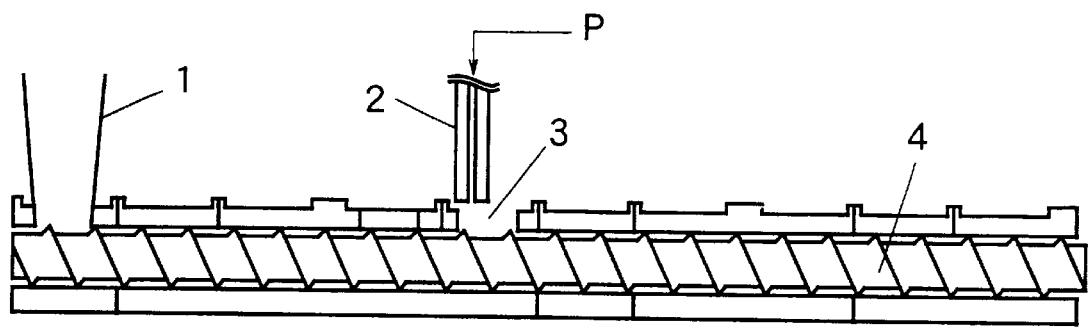
FIG. 2 is a diagrammatic side view showing the internal structure of one form of an extruder which can be used in the present invention.
Figure 3:
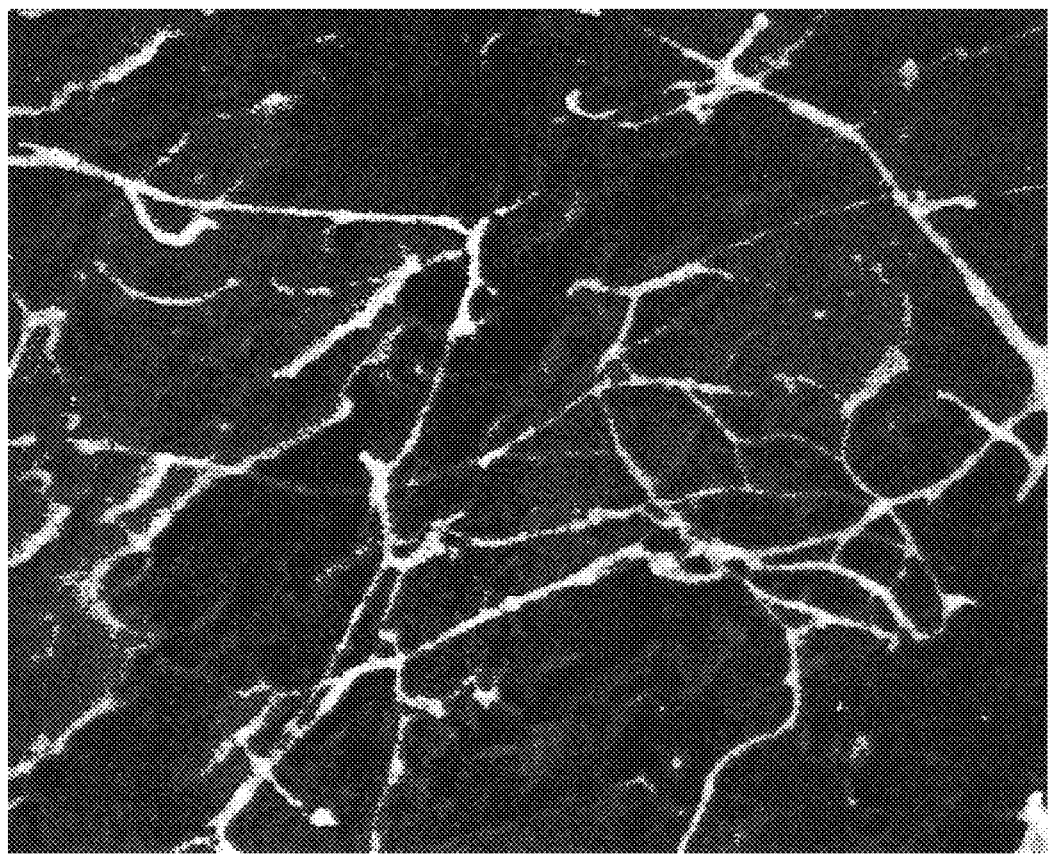
FIG. 3 is a scanning electron photomicrograph of a breakage-exposed surface of a tensile force-broken piece of a test sample obtained by molding the resin composition obtained in Example 4, showing the dispersion morphology of the fluororesin fibrils.
Figure 4:
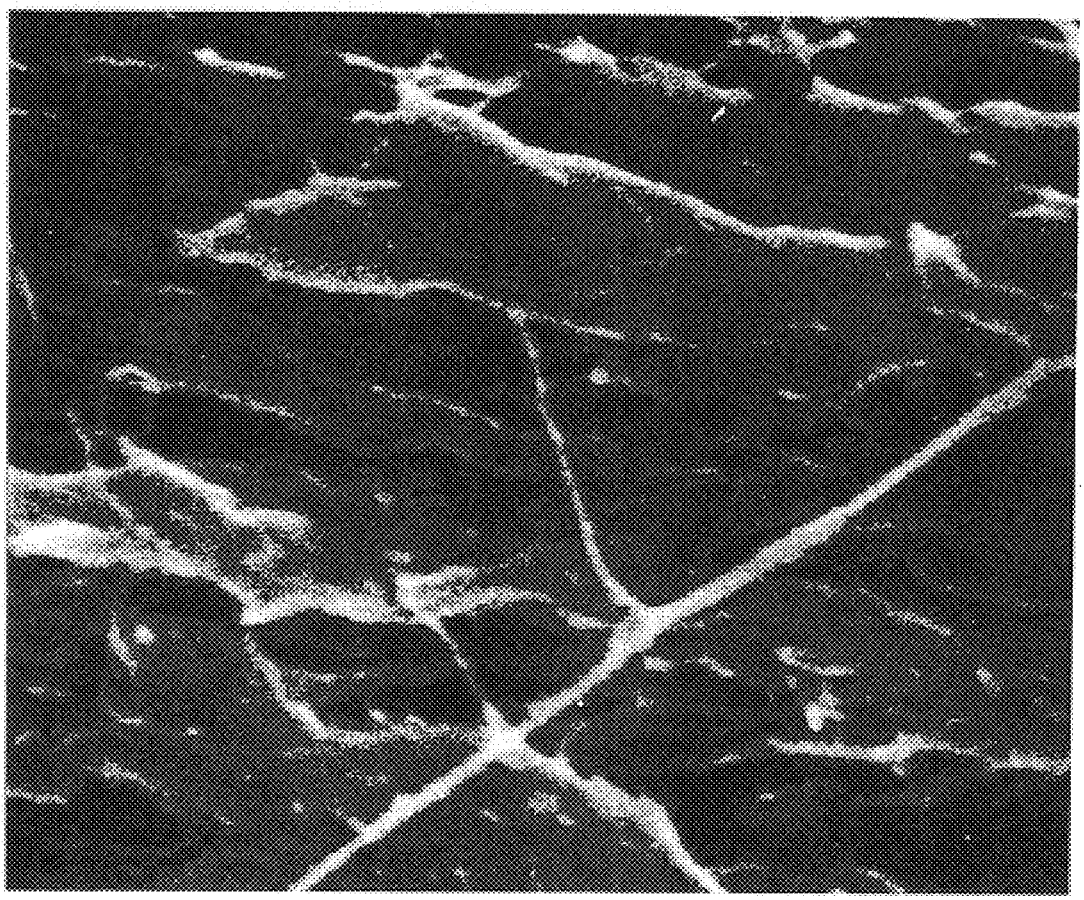
FIG. 4 is a scanning electron photomicrograph of a breakage-exposed surface of a tensile force-broken piece of a test sample obtained by molding the resin composition obtained in Comparative Example 5, showing the dispersion morphology of the fluororesin fibrils.
Figure 5:
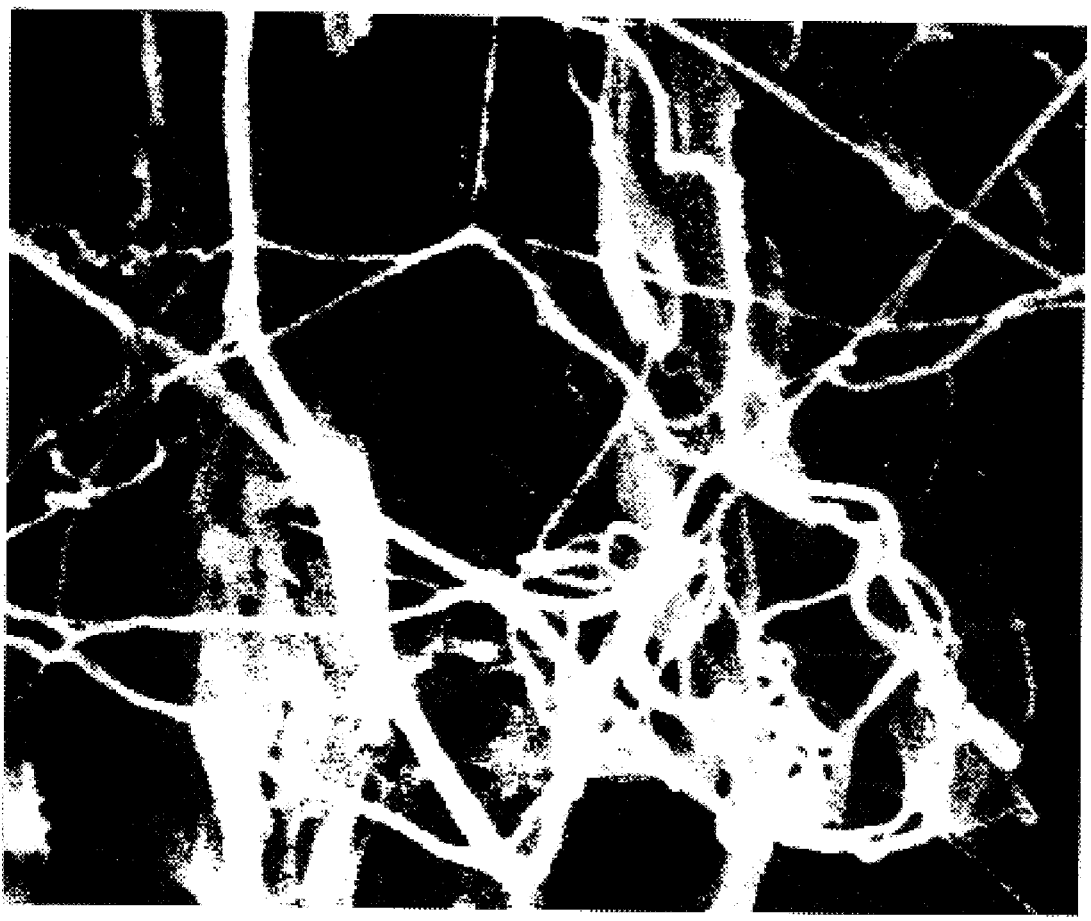
FIG. 5 is a scanning electron photomicrograph of a breakage-exposed surface of a tensile force-broken piece of a test sample obtained by molding the resin composition obtained in Example 8, showing the dispersion morphology of the fluororesin fibrils.
Figure 6:
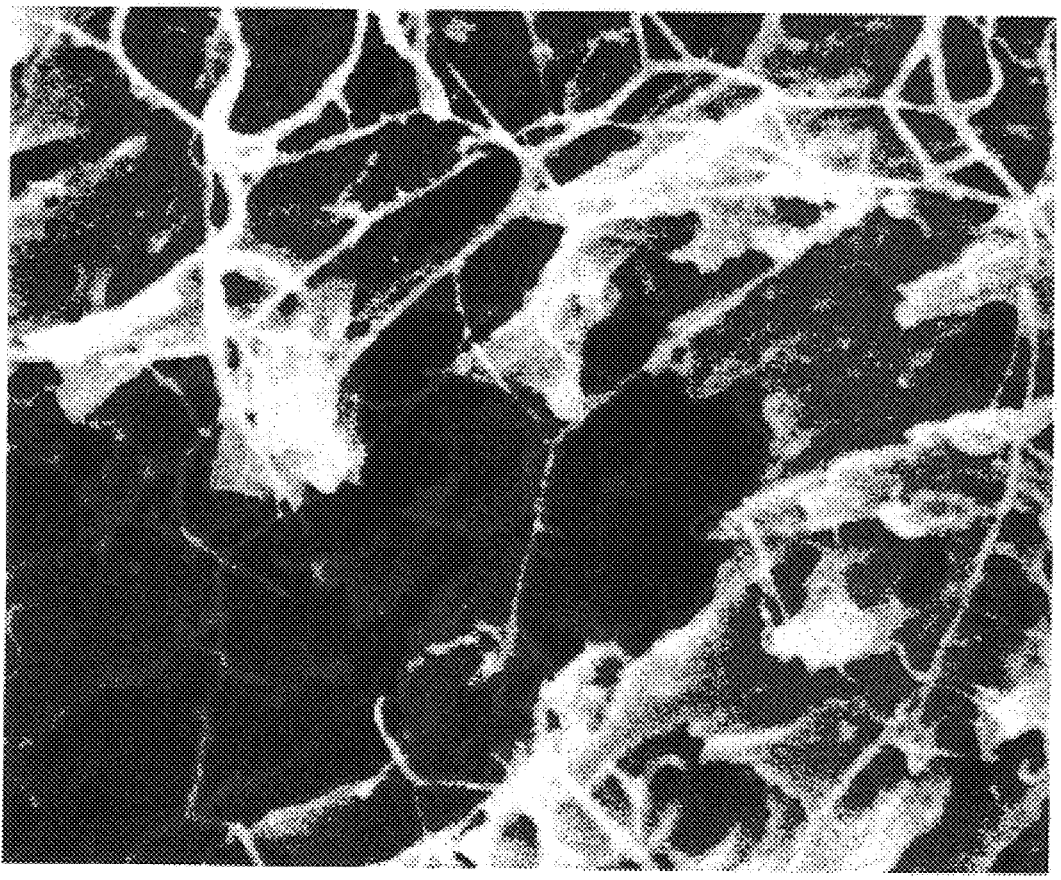
FIG. 6 is a scanning electron photomicrograph of a breakage-exposed surface of a tensile force-broken piece of a test sample obtained by molding the resin composition obtained in Example 12, showing the dispersion morphology of the fluororesin fibrils.
Figure 7:
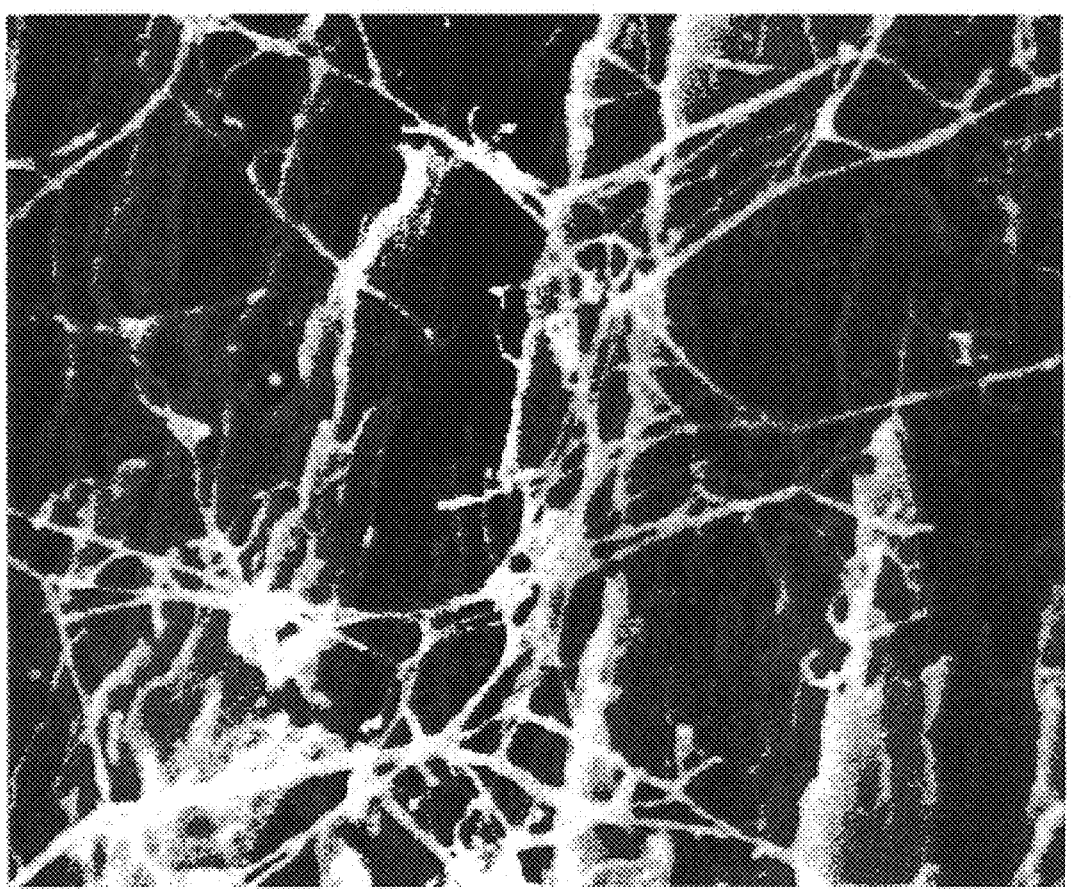
FIG. 7 is a scanning electron photomicrograph of a breakage-exposed surface of a tensile force-broken piece of a test sample obtained by molding the resin composition obtained in Example 13, showing the dispersion morphology of the fluororesin fibrils.
Figure 8:
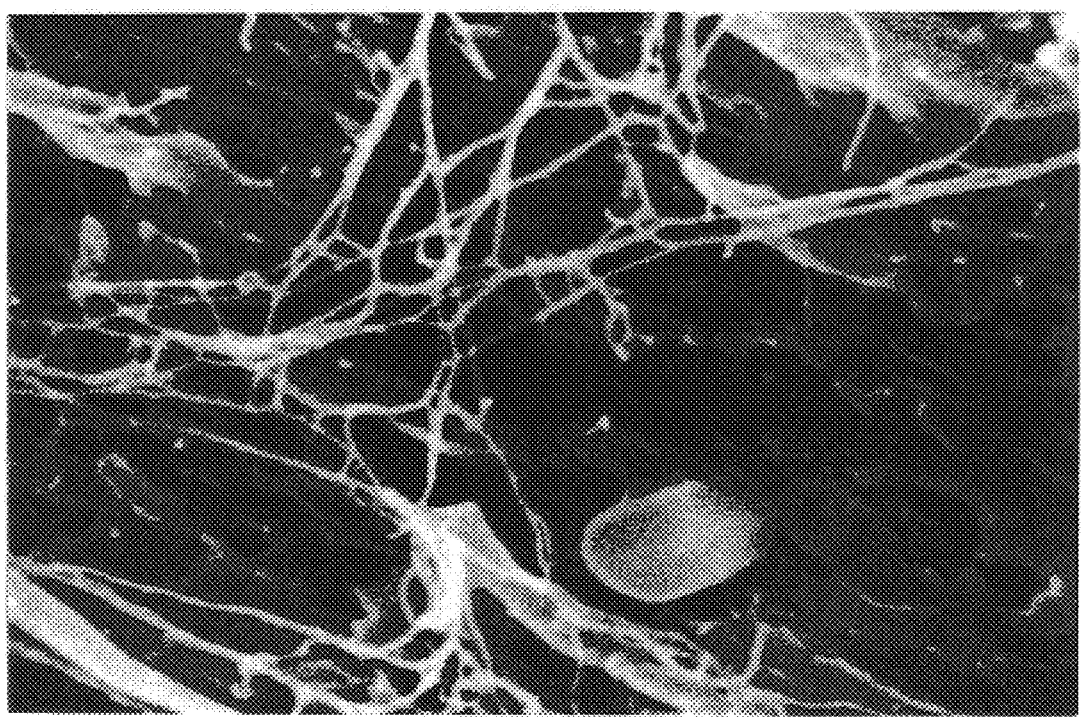
FIG. 8 is a scanning electron photomicrograph of a breakage-exposed surface of a tensile force-broken piece of a test sample obtained by molding the resin composition obtained in Example 15, showing the dispersion morphology of the fluororesin fibrils.
Figure 9:
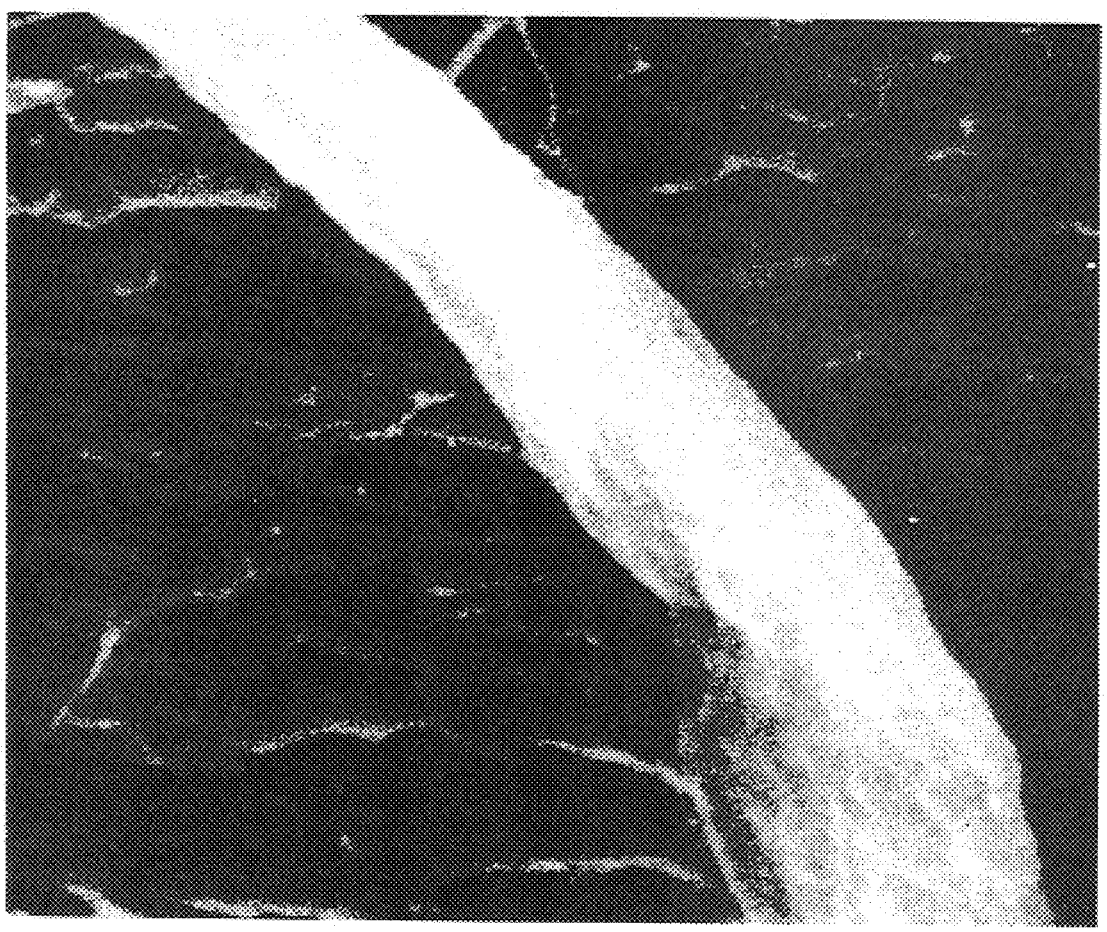
FIG. 9 is a scanning electron photomicrograph of a breakage-exposed surface of a tensile force-broken piece of a test sample obtained by molding the resin composition obtained in Comparative Example 14, showing the dispersion morphology of the fluororesin fibrils.

Further, when an extruder as shown in FIG. 2, which has opening 3 (such as a vent) at a position intermediate between both ends of the extruder, is used for the melt-kneading in each of steps (1) and (2) of the method used in the present invention, the addition of the aqueous dispersion of the fluororesin can be advantageously conducted by a method in which the aqueous dispersion of the fluororesin is dropwise fed to opening 3 of the extruder through pipe 2 which is provided just above opening 3 and which is equipped with a jacket for cooling the dispersion. Specifically, this method is advantageous in:

that it is not necessary to apply a pressure to the aqueous dispersion of the fluororesin, so that the occurrence of the coagulation of the fluororesin in pump P can be prevented;

that the opening of pipe 2 is not in contact with the extruder which has a high temperature, thereby suppressing the occurrence of the temperature elevation of the dispersion cooled by the jacket, so that the coagulation of the fluororesin does not occur in pipe 2; and that the feeding of the aqueous dispersion of the fluororesin can be performed while allowing the aqueous dispersion medium of the aqueous dispersion of the fluororesin to evaporate through vent 3, so that the removal of the aqueous dispersion medium can be efficiently performed.

Examples of pumps usable in the above method include a tube pump, a gear pump and a plunger pump. Of these, a tube pump is preferred.

Thus, according to still another aspect of the present invention, there is provided a method for producing the flame retardant resin composition, which comprises steps (1) and (2) of the above-mentioned method and which is performed by using an extruder having an opening at a position intermediate between both ends of the extruder, wherein the aqueous dispersion of the fluororesin is dropwise fed to the extruder through the opening and melt-kneaded together with the melt-kneaded material formed in step (1), while allowing the aqueous dispersion medium of the aqueous dispersion of the fluororesin to evaporate through the opening.

FIG. 2 mentioned above is a diagrammatic side view of an extruder having an opening at a position intermediate between both ends of the extruder, which is shown for explaining the method for producing the flame retardant resin composition in accordance with the above-mentioned aspect of the present invention. However, the production method of the present invention is not limited by FIG. 2. For example, with respect to the extruder, at least one additional opening (not shown) is provided between hopper 1 and opening 3 (for feeding the aqueous fluororesin dispersion). In the case of this modification of the extruder, at least a part of the thermoplastic resin and at least a part of the flame retardant can be supplied to the extruder through hopper 1 and the additional opening, respectively. Alternatively, the following modification is possible. In case the feeding of the thermoplastic resin and/or the flame retardant is not completed at a position upstream (as viewed in the direction of extrusion) of opening 3, at least one additional opening (not shown) is provided at a position downstream of opening 3, so that the remaining portion of the thermoplastic resin and/or the flame retardant can be fed to the extruder through the additional opening.

There is no particular limitation with respect to the method for molding the flame retardant thermoplastic resin composition of the present invention. Examples of methods for molding the resin composition include extrusion molding, compression molding, injection molding and gas-assisted injection molding. Among these methods, the injection molding is preferred.

Examples of molded articles which can be produced from the resin composition include housings for handheld personal computers, copying machines and printing machines; chassis for office automation machines; and housings for pocketable telephones.

BEST MODE FOR CARRYING OUT THE INVENTION

The present invention will now be further illustrated in more detail with reference to the following Examples and Comparative Examples, which should not be construed as limiting the scope of the present invention.

In the following Examples and Comparative Examples, various properties were measured and evaluated as follows.
(1) Measurement of the weight average molecular weight of a resin:

The weight average molecular weight of a resin was measured by gel permeation chromatography (GPC). Apparatus: HLC-8020 (manufactured and sold by Tosoh Corp., Japan).
Eluent: THF (tetrahydrofuran).
Column: TSK gel (T5000HXL+T4000HXL) (manufactured and sold by Tosoh Corp., Japan).
(2) Examination of the dispersion morphology of the fluororesin fibrils in the thermoplastic resin composition:

The dispersion morphology of the fluororesin fibrils in the thermoplastic resin composition was examined in accordance with the following method.
(Injection molding conditions for producing a test sample)
Injection molding machine: M-JEC10 (manufactured and sold by Modern Machinery Co., Japan)
Molding temperature: 260° C.
Mold temperature: 60° C.
Injection speed: 500 (set speed)
Size of test piece: ½ inch×5 inches×1/16 inch With respect to the above-mentioned molding conditions, the temperature conditions were varied as described below, depending on the type of the thermoplastic resin used. When polycarbonate resin A-1 described below was solely used as a thermoplastic resin, the injection molding was performed under temperature conditions wherein the molding temperature and the mold temperature were 280° C. and 80° C., respectively. When polyphenylene ether resin A-2 described below was solely used as a thermoplastic resin, the injection molding was performed under temperature conditions wherein the molding temperature and the mold temperature were 290° C. and 80° C., respectively. When rubber reinforced resin A-6 described below was solely used as a thermoplastic resin, the injection molding was performed under temperature conditions wherein the molding temperature and the mold temperature were 230° C. and 50° C., respectively.
(Preparation of a broken piece used for the examination under SEM)

Using a tensile testing machine (Autograph 5000D, manufactured and sold by Shimadzu Corporation, Japan), a tensile force was applied to the test sample obtained by the above-mentioned injection molding at a tensile speed of 5 mm/minute and maintained until the test sample was broken, to thereby obtain a broken piece having a breakage-exposed surface for the examination by means of an SEM.
(Examination under SEM)

Preliminary treatment: The breakage-exposed surface of the broken piece as described above was subjected to gold vacuum deposition so that the thickness of the resultant gold deposition became 200 angstroms or more.
(Apparatus for deposition: JFC 1500 QUICK AUTO COATER, manufactured and sold by JEOL LTD., Japan)
Examination under SEM: The SEM examination of the pretreated breakage-exposed surface of the broken piece was conducted by using the following apparatus.
Examination Apparatus: JSM-5300 (manufactured and sold by JEOL LTD., Japan) Accelerating voltage: 15 kV By the SEM examination of the breakage-exposed surface of the broken piece with respect to a predetermined area of 7 μm×7 μm wherein the fibrils are dispersed in the entire region, the ratio (%) of lengths of the fibrils which have a diameter of 0.5 μm or less, relative to the total length of the fibrils, the number of the intersecting points and the total number of the branching points were determined.
(3) Flame Retardancy:

The flame retardancy of a 1/16 inch-thick test sample was evaluated in accordance with the 20 MM Vertical Burning Method described in UL-Subject 94. In this test, the ratings "V-0" and "V-1" indicate that the occurrence of the dripping of a flaming particle is not observed, and the rating "V-2" indicates that the occurrence of the dripping of a flaming particle is observed.
(4) Luster (Gloss)

Injection molding was performed under conditions wherein the molding temperature and the mold temperature were appropriately selected depending on the formulation of the resin composition, to thereby obtain a plane plate having a size of 10 cm×10 cm×2 mm. With respect to the obtained plane plate, a surface luster was measured using a glossmeter under conditions wherein each of the incident angle and the reflection angle was 60° in accordance with ASTM-D-523-62T. (The higher the value obtained by the measurement using the glossmeter, the higher the luster of the plate, i.e., the plate has a smooth surface.)

(5) Flow Mark

Injection molding was performed under conditions wherein the molding temperature and the mold temperature were appropriately selected depending on the formulation of the resin composition, to thereby obtain a plane plate having a size of 10 cm×10 cm×2 mm. With respect to the obtained plane plate, the surface of the plane plate was visually observed to examine whether or not flow marks and/or silver streaks occurred. The results were evaluated in accordance with the following criteria.

◯: Neither flow marks nor silver streaks were observed on the surface of the plate.

x: Flow marks and/or silver streaks were observed on the surface of the plate.

Hereinbelow, explanation is made with respect to various ingredients used in the Examples and the Comparative Examples for producing resin compositions.

(Polycarbonate resin A-2)

An aromatic polycarbonate produced from bisphenol A, which has a weight average molecular weight of 22,500, was used as polycarbonate resin A-1.

(Polyphenylene ether resin A-2)

An oxidative coupling reaction of 2,6-xylenol was performed in the presence of di-n-butylamine in accordance with the method described in U.S. Pat. No. 4,788,277 (corresponding to Japanese Patent Application No. 62-77570) to thereby obtain poly(2,6-dimethyl-1,4-phenylene)ether (hereinafter, frequently referred to simply as "PPE") having a reduced viscosity $\eta_{sp}/C$ of 0.42 dl/g and a melt viscosity of 49,000 poises as measured under conditions wherein a measurement temperature was 280° C. and a shear rate was 140 sec$^{-1}$. 75 Parts by weight of the obtained PPE and 25 parts by weight of a commercially available polystyrene resin having a weight average molecular weight of 210,000 were melt-kneaded together to thereby obtain a modified PPE resin used as PPE resin A-2.

(Rubber-reinforced resin A-3)

40 Parts by weight (in terms of the amount of the solids contained in the rubber latex) of the butadiene rubber latex (having a weight average particle diameter of 0.28 μm as determined by examining a transmission electron photomicrograph of the latex), 100 parts by weight of an ion-exchanged water and 0.3 part by weight of potassium rosinate were charged in a 10 liter polymerization reactor to obtain a starting solution. After purging the gas phase in the reactor with nitrogen gas, the starting solution was heated to 70° C. The pH value of the starting solution was adjusted to about 7 by blowing carbon dioxide gas into the starting solution in the reactor. Then, a polymerization reaction was performed as follows. To the above-mentioned reactor were continuously charged aqueous solution 1, monomer mixture 3 and aqueous solution 2 containing potassium rosinate as an emulsifier, which have respective formulations mentioned below. The charging was conducted over a period of 5 hours. After completion of the charging, the temperature of a reaction mixture formed in the reactor was maintained at 70° C. for 1 hour to terminate the reaction, thereby obtaining a graft copolymer latex.

Aqueous solution 1 has the following formulation.

| | |
|---|---|
| Iron (II) sulfate: | 0.005 part by weight |
| Sodium formaldehyde sulfoxylate (SFS): | 0.1 part by weight |

-continued

| | |
|---|---|
| Disodium ethylenediaminetetraacetate (EDTA): | 0.04 part by weight |
| Ion-exchanged water: | 50 parts by weight |

Aqueous solution 2 has the following formulation.

| | |
|---|---|
| Potassium rosinate: | 1.0 part by weight |
| Ion-exchanged water: | 20 parts by weight. |

Monomer mixture 3 has the following formulation.

| | |
|---|---|
| Acrylonitrile: | 18 parts by weight |
| Styrene: | 42 parts by weight |
| t-Dodecylmercaptan (t-DM): | 0.6 part by weight |
| Cumene hydroperoxide (CHP): | 0.1 part by weight |

An antioxidant was added to the obtained graft copolymer latex and then, the latex was subjected to salting-out to thereby coagulate the graft copolymer. The coagulated graft copolymer was washed with water, dehydrated and heated for drying to thereby obtain a powder of the graft copolymer.

Then, the obtained powder of the graft copolymer was mixed with an AS resin (acrylonitrile-styrene resin) having an acrylonitrile segment content of 27% by weight and a weight average molecular weight of 120,000 to thereby obtain an ABS resin (acrylonitrilebutadiene-styrene resin) having the following formulation.

| | |
|---|---|
| Acrylonitrile segment: | 24% by weight |
| Butadiene segment: | 10% by weight |
| Styrene segment: | 66% by weight |

(Rubber-reinforced resin A-4)

Substantially the same procedure as in the above-mentioned preparation of rubber-reinforced resin A-3 was repeated, except that the ratio of the AS resin to the powder of the graft copolymer was changed, to thereby obtain an ABS resin (rubber-reinforced resin A-4) having the following formulation.

| | |
|---|---|
| Acrylonitrile segment: | 18% by weight |
| Butadiene segment: | 33% by weight |
| Styrene segment: | 49% by weight |

(Rubber-reinforced resin A-5)

As rubber-reinforced resin A-5, use was made of a rubber-reinforced thermoplastic resin having the following formulation.

| | |
|---|---|
| Acrylonitrile segment: | 18% by weight |
| Butadiene segment: | 20% by weight |
| Styrene segment: | 50% by weight |
| N-phenylmaleimide segment: | 12% by weight |

(Rubber-reinforced resin A-6)

As rubber-reinforced resin A-6, use was made of a HIPS resin (high-impact polystyrene resin), having the following formulation.

| | |
|---|---|
| Butadiene segment: | 10% by weight |
| Styrene segment: | 90% by weight |

<Fluororesin (PTFE) dispersion B-1>

A commercially available fluororesin dispersion (trade name: POLYFLON TFE dispersion D-1, manufactured and sold by Daikin Industries Ltd., Japan) having a solids content of about 60% by weight, a particle diameter of 0.20 to 0.40 μm and a pH value of 9 to 10 was used.

<Fluororesin (PTFE) dispersion B-2>

As fluororesin dispersion B-2, use was made of a commercially available fluororesin dispersion (trade name: Teflon 30-J, manufactured and sold by Du Pont-Mitsui Fluorochemicals Co., Ltd., Japan) having a solids content of 60% by weight, a particle diameter of 0.23 μm, a surfactant content of 6% by weight, based on the weight of PTFE, and a pH value of 9 to 10.

<Fluororesin (PTFE) fine powder B-3>

As fluororesin fine powder B-3, use was made of a commercially available fluororesin fine powder (trade name: POLYFLON F-201L, manufactured and sold by Daikin Industries Ltd., Japan).

<Fluororesin (PTFE) fine powder B-4>

As fluororesin fine powder B-4, use was made of a commercially available fluororesin fine powder (trade name: Teflon 62-J, manufactured and sold by Du Pont-Mitsui Fluorochemicals Co., Ltd., Japan).

(Flame retardant C-1)

As flame retardant C-1, use was made of a flame retardant having a softening temperature of 105° C., which is a compound represented by formula (2) above wherein n is 0 or a natural number, and each of R and R' represents a group represented by formula (4) above.

(Flame retardant C-2)

As flame retardant C-2, use was made of Triphenyl phosphate.

(Flame retardant C-3)

As flame retardant C-3, use was made of an oligomeric phosphate flame retardant composed mainly of a mixture of compound represented by formula (7) above and a compound represented by formula (8) above. Flame retardant C-3 was synthesized in accordance with the following procedure.

114 g (0.5 mol) of bisphenol A, 192 g (1.25 mol) of phosphorus oxychloride and 1.4 g (0.015 mol) of magnesium chloride anhydride were charged in 500 ml four-necked flask equipped with an agitator and a reflux condenser, and a reaction was performed in a nitrogen gas flow at a temperature within the range of from 70 to 140° C. for 4 hours. After completion of the reaction, the internal pressure was reduced to 200 mmHg or less using a vacuum pump, while maintaining the internal temperature of the flask at the reaction temperature, and the evaporated, unreacted phosphorus oxychloride was recovered by a trap. Subsequently, the flask was cooled to room temperature, and 122 g (1.0 mol) of 2,6-xylenol and 2.0 g (0.015 mol) of aluminum chloride anhydride were added to the cooled flask. Then, the flask was heated to a temperature within the range of from 100 to 150° C., and the temperature was maintained within this temperature range for 4 hours, thereby further performing a reaction for 4 hours. Subsequently, the flask was cooled to room temperature, and 94 g (1.0 mol) of phenol was added to the cooled flask. Then, the flask was heated to a temperature within the range of from 100 to 150° C., and the temperature was maintained within this temperature range for 4 hours. Subsequently, the reaction was terminated. The internal pressure of the flask was reduced to 1 mmHg, while maintaining the internal temperature of the flask at the reaction temperature, to remove the unreacted phenol, thereby obtaining a crude phosphate. (In each of the above-described reactions, hydrogen chloride gas generated was collected by an aqueous sodium hydroxide solution, and the amount of the hydrogen chloride gas was measured by neutralization titration, and the measured value was used for monitoring the progress of the reaction.) The obtained crude phosphate was washed with distilled water and subjected to filtration using a filter paper (#131, manufactured and sold by Advantech Toyo Kabushiki Kaisha, Japan) to remove the solids, thereby obtaining a filtrate. The filtrate was dried in vacuo to obtain a purified phosphate. The obtained purified phosphate was transparent and pale yellow.

The purified phosphate was analyzed by HPLC {LC-10A, manufactured and sold by Shimadzu Corporation, Japan; Column: TSK gel ODS-80T, manufactured and sold by Tosoh Corp., Japan; Eluent: a mixture of methanol and water (methanol/water: 90/10)}. As a result, it was found that the total content of the compound represented by formulae (7) and the compound represented by formulae (8) in the purified phosphate was 75% by weight.

EXAMPLES 1 TO 7 AND COMPARATIVE EXAMPLE 7

Fluororesins (B-3 and B-4) were individually pulverized together with dry ice (using Sample Mill model SK-M10, manufactured and sold by KYORITSU-RIKO CO., LTD., Japan). Ingredients (as mentioned above) except the fluororesins were cooled to a temperature of 3° C., and blended with the fluororesins, according to the formulations (unit: part by weight) indicated in Tables 1 and 2, and the resultant blends were individually melt-kneaded and pelletized, using a twin-screw extruder (ZSK-25, manufactured and sold by Werner & Pfleiderer GmbH, Germany), to thereby obtain pellets of thermoplastic resin compositions.

Evaluation of various properties was made with respect to the pellets in accordance with the abovementioned methods. The temperatures of the extruder for melt-kneading the above blends were set at 290° C. for Examples 1 to 3 and Comparative Example 7, at 250° C. for Examples 4 and 6, and at 220° C. for Examples 5 and 7. The results of the examination of the dispersion morphology of the fluororesin fibrils in each of the resin compositions and the results of the evaluation of the flame retardancy of each of the resin compositions are shown in Tables 1 and 2.

COMPARATIVE EXAMPLES 1 TO 6 AND 8

Ingredients (as mentioned above) were blended with one another simultaneously (at room temperature, i.e., 25° C.) according to the formulations (unit: part by weight) indicated in Table 2, and the resultant blends were individually melt-kneaded and pelletized, using a twin-screw extruder (ZSK-25, manufactured and sold by Werner & Pfleiderer GmbH, Germany), to thereby obtain pellets of thermoplastic resin compositions.

Evaluation of various properties was made with respect to the pellets in accordance with the above-mentioned methods. The temperatures of the extruder for melt-kneading the above blends were set at 290° C. for Comparative Examples 1, 6 and 8, at 250° C. for Comparative Examples 3 and 5, and at 220° C. for Comparative Examples 2 and 4. The results of the examination of the dispersion morphology of the fluororesin fibrils in each of the resin compositions and the results of the evaluation of the flame retardancy of each of the resin compositions are shown in Table 2.

In Comparative Example 6, extrusion was difficult.

EXAMPLES 8 TO 15, COMPARATIVE EXAMPLE 17

Using ingredients (as mentioned above) according to the formulations (unit: part by weight) indicated in Tables 3 and 4, resin compositions were prepared in the following manner.

Ingredients except the fluororesins and the flame retardants were blended with one another, and the resultant blends were individually melt-kneaded, using a twin-screw extruder (ZSK-25, manufactured and sold by Werner & Pfleiderer GmbH, Germany), thereby forming a melt-kneaded material, wherein the extruder has a fluororesin dispersion feed opening (such as opening 3 shown in FIG. 2) at a position intermediate between both ends of the extruder, and another intermediate opening (not shown in FIG. 2) positioned downstream of the fluororesin dispersion feed opening (as viewed in the direction of the extrusion). To the formed melt-kneaded material was dropwise added a cooled (to a temperature of 3° C.) aqueous dispersion of fluororesin through the above-mentioned fluororesin dispersion feed opening and melt-kneaded together with the melt-kneaded material, thereby forming a fluororesin-containing thermoplastic resin composition. Into the formed fluororesin-containing thermoplastic resin composition was injected a flame retardant by means of a pump through the above-mentioned another intermediate opening (not shown in FIG. 2) positioned downstream of the fluororesin dispersion feed opening, and the resultant mixture was further melt kneaded, and pelletized to thereby obtain pellets of thermoplastic resin compositions.

Evaluation of various properties was made with respect to the pellets in accordance with the above-mentioned methods. The temperatures of the extruder employed for the melt-kneading were set at 290° C. for Examples 8 to 11 and Comparative Example 17 and at 250° C. for Examples 12 to 15. The results of the examination of the dispersion morphology of the fluororesin fibrils in each of the resin compositions and the results of the evaluations of the flame retardancy, luster and flow mark of each of the resin compositions are shown in Tables 3 and 4.

In Comparative Example 17, extrusion was difficult.

EXAMPLES 16 TO 18

Using ingredients (as mentioned above) according to the formulations (unit: part by weight) indicated in Table 3, resin compositions were prepared in the following manner.

Ingredients except the fluororesins were blended with one another, and the resultant blends were individually melt-kneaded, using a twin-screw extruder (ZSK-25, manufactured and sold by Werner & Pfleiderer GmBH, Germany) having a fluororesin dispersion feed opening (such as opening 3 as shown in FIG. 2) at a position intermediate between both ends of the extruder, thereby forming a melt-kneaded material. To the formed melt-kneaded material was dropwise added a cooled (to a temperature of 3° C.) aqueous dispersion of fluororesin through the above-mentioned fluororesin dispersion feed opening and melt-kneaded together with the melt-kneaded material, thereby forming fluororesin-containing thermoplastic resin composition, and the obtained resin composition was pelletized to thereby obtain pellets of thermoplastic resin compositions.

Evaluation of various properties was made with respect to the pellets according to the above-mentioned methods. The temperatures of the extruder employed for the melt-kneading were set at 220° C. for Examples 16 and 18 and at 250° C. for Example 17. The results of the examination of the dispersion morphology of the fluororesin fibrils in each of the resin compositions and the results of the evaluations of the flame retardancy, luster, and flow mark of each of the resin compositions are shown in Table 3.

COMPARATIVE EXAMPLES 9 TO 14 AND 18

Using ingredients (as mentioned above) according to the formulations (unit: part by weight) indicated in Table 4, resin compositions were prepared in the following manner.

Ingredients (as mentioned above) except the flame retardant were blended with one another, and the resultant blends were individually melt-kneaded, using a twin-screw extruder (ZSK-25, manufactured and sold by Werner & Pfleiderer GmbH, Germany) having an opening at a position intermediate between both ends of the extruder, thereby forming a melt-kneaded resin composition. Into the formed melt-kneaded resin composition was injected a flame retardant by means of a pump through the above-mentioned intermediate opening of the extruder, and the resultant mixture was melt-kneaded and pelletized to thereby obtain pellets of thermoplastic resin compositions.

Evaluation of various properties was made with respect to the pellets in accordance with the above-mentioned methods. The temperatures of the extruder employed for the melt-kneading were set at 290° C. for Comparative Examples 9 to 12 and 18 and at 250° C. for Comparative Examples 13 and 14. The results of the examination of the dispersion morphology of the fluororesin fibrils in each of the resin compositions and the results of the evaluations of the flame retardancy, luster, and flow mark are shown in Table 4.

COMPARATIVE EXAMPLES 15 AND 16

Ingredients (as mentioned above) were blended with one another simultaneously according to the formulations (unit: part by weight) indicated in Table 4, and the resultant blends were individually melt-kneaded and pelletized, using a twin-screw extruder (ZSK-25, manufactured and sold by Werner & Pfleiderer GmbH, Germany) to thereby obtain pellets of thermoplastic resin compositions.

Evaluation of various properties was made with respect to the pellets in accordance with the above-mentioned methods. The temperatures of the extruder for melt-kneading the above blends were set at 250° C. for Comparative Example 15 and at 220° C. for Comparative Example 16. The results of the examination of the dispersion morphology of the fluororesin fibrils in each of the resin compositions and the results of the evaluations of the flame retardancy, luster, and the flow mark are shown in Table 4.

EXAMPLE 19

Using ingredients (as mentioned above) according to the formulations (unit: part by weight) indicated in Tables 3, a resin composition was prepared in the following manner.

Ingredients except the fluororesin and the flame retardant were blended with one another, and the resultant blend was melt-kneaded, using a twin-screw extruder (ZSK-25, manufactured and sold by Werner & Pfleiderer GmbH, Germany) which was set at 250° C., thereby forming a melt-kneaded resin composition, wherein the extruder has a fluororesin dispersion feed opening (such as opening 3 shown in FIG. 2) at a position intermediate between both ends of the extruder, and another intermediate opening (not shown in FIG. 2) positioned upstream of the fluororesin dispersion feed opening (as viewed in the direction of the extrusion). Into the formed melt-kneaded resin composition was injected a flame retardant by means of a pump through the above-mentioned another intermediate opening (not shown in FIG. 2) positioned upstream of the fluororesin dispersion feed opening, and the resultant mixture was melt-kneaded, thereby forming a melt-kneaded material. To the formed melt-kneaded material was dropwise added a cooled (to a temperature of 3° C.) aqueous dispersion of fluororesin through the above-mentioned fluororesin dispersion feed opening and melt-kneaded together with the melt-kneaded material, and pelletized to thereby obtain pellets of a thermoplastic resin composition.

Evaluation of various properties was made with respect to the pellets in accordance with the above-mentioned methods. The result of the examination of the dispersion morphology of the fluororesin fibrils in the resin composition and the results of the evaluations of the flame retardancy, luster, and the flow mark are shown in Table 3.

COMPARATIVE EXAMPLE 19

After adding an antioxidant to the graft copolymer latex described in the item "Rubber-reinforced resin A-3" above, the latex was subjected to salting-out to thereby coagulate a graft copolymer. The coagulated copolymer was washed with water, dehydrated and heated for drying to thereby obtain a powder of a graft copolymer. 15 Parts by weight of the obtained powder of the graft copolymer and 0.5 part by weight of fluororesin dispersion B-1 were blended homogeneously and then the resultant blend was dried. The resultant dried blend was blended with 80 parts by weight of polycarbonate resin A-1 and 5 parts by weight of an AS resin (acrylonitrile-styrene resin) having an acrylonitrile segment content of 27% by weight and having a weight average molecular weight of 120,000. The resultant blend was melt-kneaded, using an extruder (ZSK-25, manufactured and sold by Werner & Pfleiderer GmbH, Germany) which was set at 250° C., having an opening at a position intermediate between both ends of the extruder, thereby forming a melt-kneaded resin composition. Into the formed melt-kneaded resin composition was injected 8 parts by weight of flame retardant C-3 by means of a pump through the above-mentioned intermediate opening of the extruder, and the resultant mixture was melt-kneaded and pelletized to thereby obtain pellets of a thermoplastic resin composition.

Evaluation of various properties was made with respect to the pellets in accordance with the above-mentioned methods. The result of the examination of the dispersion morphology of the fluororesin fibrils in the resin composition and the results of the evaluations of the flame retardancy, luster and flow mark of the resin composition are shown in Table 4.

EXAMPLE 20

80 Parts by weight of polycarbonate resin A-1 was melted-kneaded, using a twin-screw extruder (ZSK-25, manufactured and sold by Werner & Pfleiderer GmbH, Germany), thereby forming a melt-kneaded resin, wherein the extruder has a fluororesin dispersion feed opening (such as opening 3 shown in FIG. 2) at a position intermediate between both ends of the extruder, another intermediate opening (not shown in FIG. 2) positioned upstream of the fluororesin dispersion feed opening (as viewed in the direction of the extrusion), and still another opening (not shown in FIG. 2) positioned downstream of the the fluororesin dispersion feed opening (as viewed in the direction of the extrusion). The cylinder temperature of the extruder for the melt-kneading of polycarbonate resin A-1 was set at 290° C. Into the formed melt-kneaded resin (polycarbonate resin A-1) was injected 8 parts by weight of flame retardant C-3 by means of a pump through the above-mentioned another intermediate opening positioned upstream of the fluororesin dispersion feed opening, and the resultant mixture was further melt-kneaded at a temperature of 290° C., thereby forming a melt-kneaded material. To the formed melt-kneaded material was dropwise added 0.5 part by weight of a cooled (to a temperature of 3° C.) fluororesin dispersion B-1 through the above-mentioned the fluororesin dispersion feed opening and melt-kneaded together with the melt-kneaded material at a cylinder temperature of 250° C., thereby forming a fluororesin-containing thermoplastic resin composition. Further, 20 parts by weight of rubber-reinforced resin A-4 was added to the formed fluororesin-containing thermoplastic resin composition through the above-mentioned still another intermediate opening by means of a side feeder (not shown in FIG. 2) and melt-kneaded together with the fluororesin-containing thermoplastic resin composition, and pelletized to thereby obtain pellets of a thermoplastic resin composition.

Evaluation of various properties was made with respect to the pellets in accordance with the above-mentioned methods. The result of the examination of the dispersion morphology of the fluororesin fibrils in the resin composition and the results of the evaluations of the flame retardancy, luster and flow mark of the resin composition are shown in Table 3.

From the comparison between the results of Examples 1 to 7 and the results of Comparative Examples 1 to 8, it is apparent that the resin composition of the present invention, which comprises fluororesin fibrils exhibiting a specific dispersion morphology in which the fibrils have a specific network configuration and/or a specific branched configuration, has high flame retardancy, especially a high property of dropping-prevention upon being burnt, as compared to a thermoplastic resin composition comprising fluororesin fibrils which do not exhibit the above-mentioned specific dispersion morphology.

Further, from the comparison between the results of Examples of 8 to 20 and the results of Comparative Examples 9 to 19, it is apparent:

that the method of the present invention in which a fluororesin dispersion is added to and melt-kneaded with a molten thermoplastic resin composition (melt-kneaded material) in a specific manner is effective for obtaining the resin composition of the present invention which comprises fluororesin fibrils exhibiting the above-mentioned specific dispersion morphology in which the fibrils have a specific network configuration and/or a specific branched configuration, as compared to other conventional methods for producing a thermoplastic resin composition containing fluororesin fibrils; and that the resin composition produced by the method of the present invention has an advantage such that a shaped article obtained from the resin composition has excellent appearance, as compared to the thermoplastic resin compositions which are produced by the conventional methods, as well as the above-mentioned advantage of the resin composition of the present invention, i.e., high flame retardancy, especially a high property of dripping-prevention upon being burnt.

TABLE 1

|  |  | Example 1 | Example 2 | Example 3 | Example 4 | Example 5 | Example 6 | Example 7 |
|---|---|---|---|---|---|---|---|---|
| Thermoplastic resin | A-1 | 100 | 100 |  | 80 |  |  |  |
|  | A-2 |  |  | 100 |  |  |  |  |
|  | A-3 |  |  |  | 20 | 100 |  |  |
|  | A-5 |  |  |  |  |  | 100 |  |
|  | A-6 |  |  |  |  |  |  | 100 |
| Fluororesin | B-3 | 0.3 | 0.3 | 0.3 | 0.3 | 0.3 | 0.3 | 0.3 |
| Flame retardant | C-1 |  |  |  |  | 16 | 16 | 16 |
|  | C-2 | 8 |  |  |  |  |  |  |
|  | C-3 |  | 8 | 8 | 8 |  |  |  |
|  | Diantimony trioxide |  |  |  |  | 6 | 6 | 6 |
| Dispersion morphology of fluororesin fibrils | Item(1) (%) | 70 or more | 70 or more | 70 or more | 70 or more | 70 or more | 70 or more | 70 or more |
|  | Item(2) | 10 or more | 10 or more | 10 or more | 10 or more | 10 or more | 10 or more | 10 or more |
| Flame retardancy (UL-94) |  | V-0 | V-0 | V-0 | V-0 | V-0 | V-0 | V-0 |

Note: In each of Tables 1 to 4, each unit of the proportion of a component in a composition is "part by weight".
The composition of a fluororesin dispersion represented by part by weight is based on the total weight of the dispersion including the weight of water.
In a predetermined area of 7 μm × 7 μm wherein the fibrils are dispersed in the entire region (SEM photograph),
Item(1): Proportion (%) of lengths of the fibrils which lengths have a diameter of 0.5 μm or less, relative to the total length of the fibrils.
Item(2): Number of points selected from the group consisting of the intersecting points and the branching points.

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Thermoplastic resin | A-1 |  |  |  |  | 80 | 100 | 100 | 100 |
|  | A-2 | 100 |  |  |  |  |  |  |  |
|  | A-3 |  | 100 |  |  | 20 |  |  |  |
|  | A-5 |  |  | 100 |  |  |  |  |  |
|  | A-6 |  |  |  | 100 |  |  |  |  |
| Fluororesin | B-3 | 0.3 | 0.3 | 0.3 | 0.3 | 0.3 | 8 |  |  |
|  | B-4 |  |  |  |  |  |  | 0.3 | 0.3 |
| Flame retardant | C-1 |  | 16 | 16 | 16 |  |  |  |  |
|  | C-2 | 8 |  |  |  |  | 8 | 8 | 8 |
|  | C-3 |  |  |  |  | 8 |  |  |  |
|  | Diantimony trioxide |  | 6 | 6 | 6 |  |  |  |  |
| Dispersion morphology of fluororesin fibrils | Item(1) (%) | 45 or less | 60 or more | 40 or less | 50 or more | 80 or more | 10 or less | 10 or less | 10 or less |
|  | Item(2) | 3 or less | 3 or less | 3 or less | 3 or less | 3 or less | 3 or less | 3 or less | 3 |
| Flame retardancy (UL-94) |  | V-2 | V-2 | V-2 | V-2 | V-2 | V-2 | V-2 | V-2 |

In a predetermined area of 7 μm × 7 μm wherein the fibrils are dispersed in the entire region (SEM photograph),
Item(1): Proportion (%) of lengths of the fibrils which lengths have a diameter of 0.5 μm or less, relative to the total length of the fibrils.
Item(2): Number of points selected from the group consisting of the intersecting points and the branching points.

TABLE 3

|  |  | Example 8 | Example 9 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|---|
| Thermoplastic resin | A-1 | 100 | 100 | 100 |  | 80 | 80 | 80 | 80 |  |  |  | 80 | 80 |
|  | A-2 |  |  |  | 100 |  |  |  |  |  |  |  |  |  |
|  | A-3 |  |  |  |  | 20 | 20 | 20 | 20 | 100 |  |  |  |  |
|  | A-4 |  |  |  |  |  |  |  |  |  |  |  | 20 | 20 |
|  | A-5 |  |  |  |  |  |  |  |  |  | 100 |  |  |  |
|  | A-6 |  |  |  |  |  |  |  |  |  |  | 100 |  |  |
| Fluororesin | B-1 | 0.5 |  |  | 0.5 | 0.5 | 0.5 |  |  | 0.5 |  | 0.5 |  | 0.5 |
|  | B-2 |  | 0.5 | 0.5 |  |  |  | 0.5 | 0.5 |  | 0.5 |  | 0.5 |  |

TABLE 3-continued

|  |  | Example 8 | Example 9 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|---|
| Flame retardant | C-1 |  |  |  |  |  |  |  |  | 16 | 16 | 16 |  |  |
|  | C-2 |  | 8 |  |  | 8 |  | 8 |  |  |  |  |  |  |
|  | C-3 | 8 |  | 8 | 8 |  | 8 |  | 8 |  |  |  | 8 | 8 |
|  | Diantimony trioxide |  |  |  |  |  |  |  |  | 6 | 6 | 6 |  |  |
| Dispersion morphology of fluororesin fibrils | Item(1) (%) | 80 or more | 80 or more | 80 or more | 80 or more | 80 or more | 80 or more | 80 or more | 80 or more | 80 or more | 80 or more | 80 or more | 80 or more | 80 or more |
|  | Item(2) | 15 or more | 15 or more | 15 or more | 15 or more | 15 or more | 15 or more | 15 or more | 15 or more | 15 or more | 15 or more | 15 or more | 15 or more | 15 or more |
| Flame retardancy (UL-94) |  | V-0 | V-0 | V-0 | V-0 | V-0 | V-0 | V-0 | V-0 | V-0 | V-0 | V-0 | V-0 | V-0 |
| Luster |  | 108 | 108 | 108 | 106 | 104 | 105 | 105 | 104 |  |  |  | 103 | 103 |
| Flow mark |  | ○ | ○ | ○ | ○ | ○ | ○ | ○ | ○ | ○ | ○ | ○ | ○ | ○ |

In a predetermined area of 7 μm × 7 μm wherein the fibrils are dispersed in the entire region (SEM photograph),
Item(1): Proportion (%) of lengths of the fibrils which lengths have a diameter of 0.5 μm or less, relative to the total length of the fibrils.
Item(2): Number of points selected from the group consisting of the intersecting points and the branching points.

TABLE 4

|  |  | Comparative Example 9 | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 |
|---|---|---|---|---|---|---|---|---|---|---|---|---|
| Thermoplastic resin | A-1 | 100 | 100 |  |  | 80 | 80 |  |  | 100 | 100 |  |
|  | A-2 |  | 100 | 100 |  |  |  |  |  |  |  |  |
|  | A-3 |  |  |  |  | 20 | 20 |  |  |  |  |  |
|  | A-4 |  |  |  |  |  |  |  |  |  |  |  |
|  | A-5 |  |  |  |  |  |  | 100 |  |  |  |  |
|  | A-6 |  |  |  |  |  |  |  | 100 |  |  |  |
| Fluororesin | B-1 | 0.5 |  | 0.5 |  | 0.5 |  | 0.5 | 0.5 | 10 |  |  |
|  | B-2 |  | 0.5 |  | 0.5 |  | 0.5 |  |  |  |  |  |
|  | B-3 |  |  |  |  |  |  |  |  |  |  | 0.3 |
| Flame retardant | C-1 |  |  |  |  |  |  | 16 | 16 |  |  |  |
|  | C-2 | 8 | 8 | 8 | 8 | 8 | 8 |  |  | 8 | 8 |  |
|  | C-3 |  |  |  |  |  |  |  |  |  |  |  |
|  | Diantimony trioxide |  |  |  |  |  |  | 6 | 6 |  |  |  |
| Dispersion morphology of fluororesin fibrils | Item(1) (%) | 30 or less | 35 or less | 30 or less | 30 or less | 60 or more | 70 or more | 50 or more | 45 or less | 10 or less | 10 or less | 10 or less |
|  | Item(2) | 3 or less | 3 or less | 3 or less | 3 or less | 3 or less | 3 or less | 3 or less | 3 or less | 3 or less | 3 or less | 3 or less |
| Flame retardancy (UL-94) |  | V-2 | V-2 | V-2 | V-2 | V-2 | V-2 | V-2 | V-2 | V-2 | V-2 | V-2 |
| Luster |  | 102 | 101 | 100 | 101 | 95 | 94 |  |  | 69 | 99 | 93 |
| Flow mark |  | X | X | X | X | X | X | X | X | X |  |  |

In a predetermined area of 7 μm × 7 μm wherein the fibrils are dispersed in the entire region (SEM photograph),
Item(1): Proportion (%) of lengths of the fibrils which lengths have a diameter of 0.5 μm or less, relative to the total length of the fibrils.
Item(2): Number of points selected from the group consisting of the intersecting points and the branching points.

INDUSTRIAL APPLICABILITY

The flame retardant resin composition of the present invention, which comprises a thermoplastic resin, a flame retardant, and fluororesin fibrils which are dispersed in a mixture of the thermoplastic resin and the flame retardant and exhibit a specific dispersion morphology, is advantageous not only in that it has high flame retardancy, especially a high property of dripping-prevention upon being burnt, but also in that a shaped article obtained from the resin composition has excellent appearance. Further, the method of the present invention, which is characterized by melt-kneading a thermoplastic resin and a flame retardant with an aqueous fluororesin dispersion in a specific manner, is suitable for producing the above-mentioned flame retardant resin composition which contains dispersed fluororesin fibrils exhibiting a specific dispersion morphology.

Therefore, the flame retardant resin composition of the present invention and the method for producing the same can be advantageously used in various fields in which articles are required to have high flame retardancy in view of a strong demand for improved safety in accidents of fire, wherein the articles include, for example, office automation machines, such as computers, word processors, printing machines and copying machines; electric household appliances, such as television receivers and game machines; and housings for pocketable telephones and the like.

What is claimed is:

1. A flame retardant resin composition comprising:

(A) 100 parts by weight of a thermoplastic resin, (B) 0.01 to 5 parts by weight of a fluororesin, and (C) 0.1 to 30 parts by weight of a flame retardant, said fluororesin (B) being present in the form of fibrils, and said thermoplastic resin (A) and said flame retardant (C) being present in the form of a mixture thereof, and wherein, when a breakage-exposed surface of a broken piece obtained from a test sample of said resin composition is examined by means of a scanning electron microscope with respect to a predetermined area of 7 $\mu$m×7 $\mu$m wherein said fibrils are dispersed in the entire region of said predetermined area, said dispersed fibrils exhibit a dispersion morphology in which said fibrils have a diameter of 0.5 $\mu$m or less over lengths of said fibrils which lengths correspond to 50% or more of the total length of said fibrils and in which said fibrils have at least one configuration selected from the group consisting of a network configuration comprising one or more intersecting points at which at least two fibrils intersect with each other and a branched configuration comprising one or more branching points at which a fibril branches into at least two fibrils, wherein 5 or more points selected from the group consisting of said intersecting points and said branching points are present in said predetermined area of 7 $\mu$m×7 $\mu$m, said breakage-exposed surface of the broken piece being obtained by applying to said test sample a tensile force sufficient to break said test sample and form a surface of the resultant broken piece which surface is exposed by breakage, wherein said test sample is prepared by injection molding so as to be used in a flame retardancy test by the Vertical Burning Method described in UL-Subject 94.

2. The resin composition according to claim 1, wherein said fibrils have a diameter of 0.5 $\mu$m or less over lengths of said fibrils which lengths correspond to 70% or more of the total length of said fibrils, and wherein 10 or more points selected from the group consisting of said intersecting points and said branching points are present in said predetermined area of 7 $\mu$m×7 $\mu$m.

3. The resin composition according to claim 1 or 2, wherein thermoplastic resin (A) comprises a rubber-reinforced resin (A-d) comprising:

a graft copolymer which is obtained by graft-copolymerizing a rubber polymer with at least one vinyl compound graft-copolymerizable with said rubber polymer, and a vinyl polymer.

4. The resin composition according to claim 1 or 2, wherein thermoplastic resin (A) comprises:

5 to 98 parts by weight of a polycarbonate resin (A-e), and 95 to 2 parts by weight of a rubber-reinforced resin (A-d), said rubber-reinforced resin (A-d) comprising:

a graft copolymer which is obtained by graft-copolymerizing a rubber polymer with at least one vinyl compound graft-copolymerizable with said rubber polymer, and a vinyl polymer.

5. The resin composition according to claim 1 or 2, wherein fluororesin (B) is a polytetrafluoroethylene.

6. The resin composition according to claim 1 or 2, wherein flame retardant (C) is a halogen-containing flame retardant.

7. The resin composition according to claim 1 or 2, wherein flame retardant (C) is a phosphate flame retardant.

8. The resin composition according to claim 1 or 2, wherein flame retardant (C) is an oligomeric phosphate flame retardant.

9. A shaped resin article produced from the resin composition of claim 1.

10. A method for producing a flame retardant resin composition comprising 100 parts by weight of a thermoplastic resin, 0.01 to 5 parts by weight of a fluororesin, and 0.1 to 30 parts by weight of a flame retardant, which method comprises:

(1) melt-kneading together 10 to 100 parts by weight of a thermoplastic resin (A) and 0 to 30 parts by weight of a flame retardant (C), thereby forming a melt-kneaded material, and (2) adding 0.01 to 5 parts by weight of a fluororesin (B) to said melt-kneaded material, and melt-kneading together said fluororesin (B) and said melt-kneaded material, thereby forming a fluororesin-containing thermoplastic resin composition, said fluororesin (B) being in the form of an aqueous dispersion thereof in an aqueous dispersion medium, said aqueous dispersion having a fluororesin particle diameter of from 0.05 to 0.5 $\mu$m and having a solids content of from 10 to 70% by weight, wherein, when a desired ratio within the component (A)/component (C) weight ratio range of 100/0.1 to 30 is not satisfied with respect to component (A) and component (C) which are melt-kneaded in step (1), at least one component selected from the group consisting of component (A) and component (C) is added, in an amount necessary for satisfying said desired ratio within the component (A)/component (C) weight ratio range of 100/0.1 to 30, to the fluororesin-containing thermoplastic resin composition formed in step (2) in at least one additional subsequent stage, wherein the resultant mixture in each stage is subjected to further melt-kneading.

11. The method according to claim 9, which is performed by using an extruder having an opening at a position intermediate between both ends of said extruder, wherein said fluororesin (B) in the form of said aqueous dispersion thereof is dropwise fed to said extruder through said opening and melt-kneaded together with said melt-kneaded material formed in step (1), while allowing the aqueous dispersion medium of the aqueous dispersion of fluororesin (B) to evaporate through said opening.

12. A resin composition produced by the method of claim 10 or 11.

13. A shaped resin article produced from the resin composition of claim 12.

* * * * *